(12) United States Patent
Yasumura

(10) Patent No.: US 7,054,167 B2
(45) Date of Patent: May 30, 2006

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/982,246

(22) Filed: Nov. 5, 2004

(65) Prior Publication Data

US 2005/0099826 A1    May 12, 2005

(30) Foreign Application Priority Data

| Nov. 12, 2003 | (JP) | ............................. P2003-382380 |
| Nov. 12, 2003 | (JP) | ............................. P2003-382381 |
| Aug. 23, 2004 | (JP) | ............................. P2004-242205 |

(51) Int. Cl.
    *H03M 3/335*    (2006.01)
(52) U.S. Cl. ......................... 363/16; 363/127; 323/207
(58) Field of Classification Search .................. 363/16, 363/127, 15, 25, 24
    See application file for complete search history.

(56) References Cited

U.S. PATENT DOCUMENTS 5,353,212 A * 10/1994 Loftus, Jr. .................. 363/17

FOREIGN PATENT DOCUMENTS

JP     2003-189617    7/2003

* cited by examiner

*Primary Examiner*—Shawn Riley
(74) *Attorney, Agent, or Firm*—Lerner, David, Littenberg, Krumholz & Mentlik, LLP

(57) ABSTRACT

A switching power supply circuit achieves improvement of the power conversion efficiency while a high power factor is maintained, in which the power factor of a current resonance converter is improved by feeding back a switching output to a rectification current path to selectively interrupt the rectification current, thereby to expand the conduction angle of ac input current. This allows elimination of a power choke coil to achieve improvement of the power conversion efficiency. Further, the magnetic flux density of an insulating converter transformer is set lower than a predetermined level, so that secondary side rectification current normally maintains a continuous mode irrespective of a variation of the load or the input voltage. This decreases the power loss that appears when the secondary side rectification current is placed into a discontinuous mode and thereby achieves further improvement of the power conversion efficiency.

11 Claims, 25 Drawing Sheets

PIT

Po=150W

VAC=220V

VFT

Po=150W

VAC=220V

Po=150W

VAC=100V

Po=150W

VAC=220V

Po=150W

VAC=100V

 US 7,054,167 B2  …

SWITCHING POWER SUPPLY CIRCUIT

BACKGROUND OF THE INVENTION

This invention relates to a switching power supply circuit provided as a power supply in various electronic apparatus.

In recent years, thanks to the development of a switching element which can withstand comparatively high current and voltage of a high frequency, most of power supply circuits which rectify an ac voltage from a commercial power supply to obtain a desired dc voltage are formed as power supply circuits of the switching system.

A switching power supply circuit uses a high switching frequency to decrease the size of a transformer and other parts and is formed as a DC-DC converter of high power for use as a power supply for various electronic apparatus.

Incidentally, it is conventionally known that, if an ac input voltage is rectified, then the current flowing through a smoothing circuit has a distorted waveform, which deteriorates the power factor representative of efficiency in utilization of a power supply.

Further, higher harmonics originating from current of a distorted waveform have the possibility of having a bad influence on the load side, and therefore, a countermeasure for suppressing such distortion in a current waveform is required.

Thus, a switching power supply circuit is conventionally known wherein a power choke coil is inserted in series in a commercial ac power supply line to expand the conduction angle of the ac input current to achieve improvement of the power factor (so-called, choke input system).

FIG. 30 shows a configuration of a conventional switching power supply circuit which includes a countermeasure for improving the power factor according to the choke input system.

The power supply circuit shown in FIG. 30 adopts a combination of a current resonance converter of the separately excited type and a partial voltage resonance circuit as a configuration of the primary side.

Referring to FIG. 30, the power supply circuit shown includes a noise filter formed from a pair of filter capacitors CL and a common mode choke coil CMC for the line of a commercial ac power supply AC.

At the following stage of the noise filter, a full-wave rectification smoothing circuit is provided which includes a bridge rectification circuit Di and a smoothing capacitor Ci. A rectified smoothed voltage Ei (dc input voltage) is obtained across the smoothing capacitor Ci by cooperative full-wave rectification operation by the bridge rectification circuit Di and the smoothing capacitor Ci. The rectified smoothed voltage Ei has a level equal to the ac input voltage VAC.

Further, a power choke coil PCH is inserted in series between the noise filter and the bridge rectification circuit Di as seen in FIG. 30 in a line of the commercial ac power supply AC.

The current resonance converter which receives the dc input voltage to perform a switching operation includes two switching elements Q1, Q2 each in the form of a MOS-FET connected in half-bridge connection. Damper diodes DD1, DD2 each in the form of a body diode are connected in parallel in directions shown in FIG. 30 between the drains and the sources of the switching elements Q1, Q2, respectively.

A partial resonance capacitor Cp is connected in parallel between the drain and the source of the switching element Q2. The capacitance of the partial resonance capacitor Cp and the leakage inductance L1 of a primary winding N1 form a parallel resonance circuit (partial voltage resonance circuit). Thus, a partial voltage resonance operation wherein voltage resonance is exhibited only upon turning off of the switching elements Q1, Q2 is obtained.

In the power supply circuit, in order to drive the switching elements Q1, Q2 for switching, an oscillation and drive circuit 2 is provided which may be formed typically from an IC for universal use. The oscillation and drive circuit 2 includes an oscillation circuit and a drive circuit not shown. The oscillation circuit and the drive circuit cooperatively generate a drive signal (gate voltage) of a required frequency to be applied to the gates of the switching elements Q1, Q2. Consequently, the switching elements Q1, Q2 perform switching operation wherein they alternately switch on/off in a required switching frequency.

An isolating converter transformer PIT transmits a switching output of the switching elements Q1, Q2 to the secondary side. The primary winding N1 of the isolating converter transformer PIT is connected at one end thereof to a node (switching output point) between the source of the switching element Q1 and the drain of the switching element Q2 through a series connection of a primary side series resonance capacitor C1 so that the switching output is transmitted.

The primary winding N1 is connected at the other end thereof to the primary side ground.

The capacitance of the series resonance capacitor C1 and the leakage inductance L1 of the isolating converter transformer PIT including the primary winding N1 form a primary side series resonance circuit for achieving operation of the current resonance type as operation of the primary side switching converter.

Thus, from the foregoing description, the primary side switching converter described above provides operation of the current resonance type by the primary side series resonance circuit (L1-C1) and partial voltage resonance operation by the partial voltage resonance circuit (Cp//L1) described hereinabove.

In other words, the power supply circuit shown in FIG. 30 has a configuration which includes a combination of a resonance circuit for forming a primary side switching converter as that of the resonance type with another resonance circuit. In the present specification, a switching converter of the type just described is referred to as composite resonance converter.

Though not shown in the drawings, the isolating converter transformer PIT includes an EE type core which includes a combination of E type cores typically made of a ferrite material. A wiring receiving portion of the isolating converter transformer PIT is divided into winding receiving portions for the primary side and the secondary side, and the primary winding N1 and a secondary winding (N2A and N2B) described below are wound on a central magnetic leg of the EE type core.

A gap G is formed in the central magnetic leg of the EE type core. More particularly, the gap G is formed in a size of approximately 1.0 mm so that a coupling coefficient k of approximately 0.85 is obtained.

Further, in the circuit shown in FIG. 30, the numbers of turns of the secondary windings N2A, N2B and the primary winding N1 are set so that the induced voltage level per one turn (1 T) of the secondary side winding might be 5 V/T.

The secondary winding N2 of the isolating converter transformer PIT has a center tap and is therefore divided into two secondary windings N2A, N2B. An alternating voltage corresponding to a switching output transmitted to the primary winding N1 is excited in each of the secondary windings N2A, N2B.

The center tap of the secondary windings N2 is connected to the secondary side ground. A full-wave rectification circuit is connected to the secondary windings N2A, N2B and includes rectification diodes D01 D02 and a smoothing capacitor C0. Consequently, a secondary side dc output voltage E0 is obtained as a voltage across the smoothing capacitor C0. The secondary side dc output voltage E0 is supplied to a load not shown and is inputted also as a detection voltage for a control circuit 1 described below.

The control circuit 1 supplies a detection output corresponding to a level variation of the secondary side dc output voltage E0 to the oscillation and drive circuit 2. The oscillation and drive circuit 2 drives the switching elements Q1, Q2 with a switching frequency which varies in response to the detection output of the control circuit 1 inputted thereto. As the switching frequency of the switching elements Q1, Q2 is varied in this manner, the level of the secondary side dc output voltage is stabilized.

According to such a configuration for improvement of the power factor by the choke input system as shown in FIG. 30, the power choke coil PCH inserted in series in the line of the commercial ac power supply AC as described hereinabove smoothes the power in the frequency region of the commercial ac power supply and expands the conduction angle of the ac input current IAC to achieve improvement of the power factor.

It is to be noted that Japanese Patent Laid-open No. 2003-189617 discloses a related switching power supply circuit.

With the circuit of FIG. 30 which adopts the choke input system, however, reactive power which arises from iron loss of the core and copper loss of the coils is produced by the power choke coil PCH. The reactive power produced by the power choke coil PCH in this manner deteriorates the ac to dc power conversion efficiency of the power supply circuit.

If the inductance value of the power choke coil PCH is set to a higher value in order to obtain a sufficient effect of power factor improvement, then such iron loss and copper loss as mentioned above are likely to increase, which gives rise to further deterioration of the power conversion efficiency.

SUMMARY OF THE INVENTION

It is an object of the preset invention to provide a switching power supply circuit which achieves improvement of the power conversion efficiency while a high power factor is maintained.

In order to attain the object described above, according to the present invention, there is provided a switching power supply circuit, including a rectification smoothing section for receiving an ac voltage as an input thereto to produce a rectified smoothed voltage, a switching section including a switching element for receiving the rectified smoothed voltage as a dc input voltage thereto to perform switching operation, and a switching drive section for driving the switching element at a predetermined switching frequency to perform the switching operation. The switching power supply circuit includes an insulating converter transformer including a primary winding wound thereon for receiving a switching output obtained by the switching operation of the switching section and a secondary winding wound thereon for exciting an alternating voltage using the switching output obtained by the primary winding. The switching power supply circuit includes a primary side series resonance circuit formed from a leakage inductance component of the primary winding of the insulating converter transformer and a capacitance of a primary side series resonance capacitor connected in series to the primary winding for causing the switching section to perform operation of the current resonance type. The switching power supply circuit includes a secondary side smoothing capacitor and a dc output voltage generation section for rectifying the alternating voltage obtained by the secondary winding of the insulating converter transformer and charging the secondary side smoothing capacitor with resulting rectification current to obtain a secondary side dc output voltage as a voltage across the secondary side smoothing capacitor. The switching power supply circuit includes a constant voltage control section for variably controlling the switching frequency of the switching drive section in response to the level of the secondary side dc output voltage to perform constant voltage control of the secondary side dc output voltage. Further, the switching power supply circuit includes a power factor improving circuit for feeding back the alternating voltage based on the switching output of the switching section to a rectification current path formed in the rectification smoothing section and utilizing the alternating voltage based on the switching output to selectively interrupt the rectified current component by a rectifying element provided in the rectification smoothing section to improve the power factor. The insulating converter transformer is formed so as to have a magnetic flux density set at a predetermined level with which secondary side rectification current flowing in the dc output voltage generation section has a continuous mode irrespective of a load condition connected to the secondary side dc output voltage and a variation of the input ac voltage.

In the switching power supply circuit, a current resonance converter is formed as a primary side switching converter. Further, the improvement of the power factor is achieved by feeding back the switching output of the switching section to the rectification current path of the rectification smoothing circuit for the input ac voltage to selectively interrupt the rectification current thereby to expand the conduction angle of the ac input current.

According to the configuration, the necessity, for example, for a power choke coil as is used in a conventional switching power supply circuit is eliminated.

Further, the magnetic flux density of the insulating converter transformer is set at the predetermined level so that, even if a load variation or a variation of the level of the input ac voltage occurs, the secondary side rectification current normally maintains the continuous mode. Where the secondary side rectification current has the continuous mode, the continuity period of the secondary side rectification current is expanded when compared with that in an alternative case wherein the secondary side rectification current has a discontinuous mode. Consequently, the peak level of the secondary side rectification current is suppressed. Consequently, although a conventional switching power supply circuit exhibits an increase of the continuity loss of a secondary side rectification element when the switching power supply is in a heavy load condition because the secondary side rectification current is placed into the discontinuous mode, the switching power supply circuit of the present invention can suppress such increase of the continuity loss.

Thus, with the switching power supply circuit, since a power choke coil normally provided for improvement of the power factor can be eliminated, the power conversion efficiency can be improved without generation of reactive power which is cause otherwise by such power choke coil.

Further, since the magnetic flux density of the insulating converter transformer is set at the predetermined level, the continuity loss of the rectification element which otherwise appears within a discontinuous period of the secondary side rectification current can be suppressed. Consequently, reduction of the reactive power caused by such continuity loss can be suppressed. In other words, this achieves further improvement of the power conversion efficiency of a switching power supply circuit which has a configuration for improving the power factor.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENT

Figure 1:
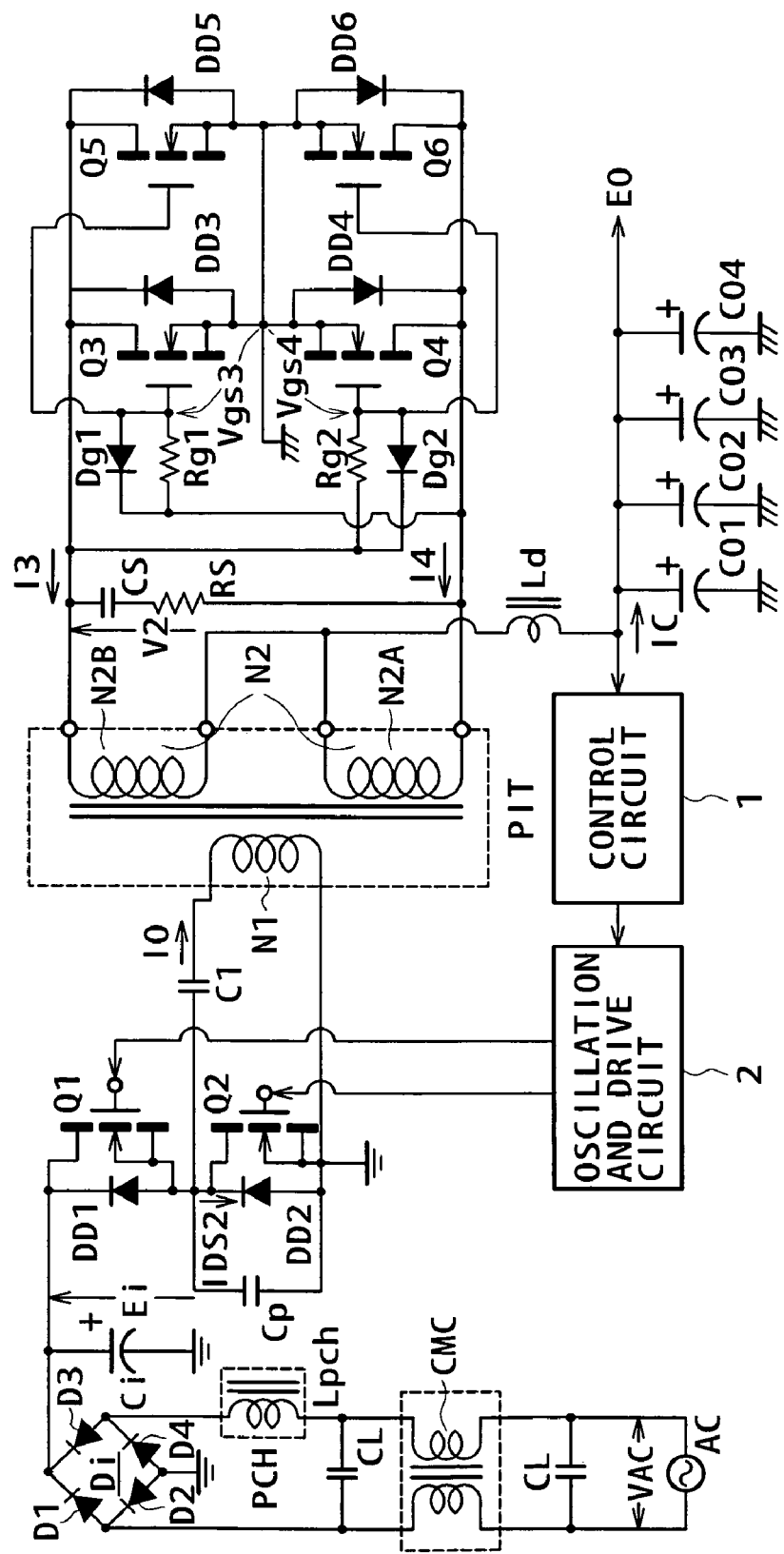
FIG. 1 is a circuit diagram showing a basic circuit configuration of a switching power supply circuit to which a first embodiment of the present invention can be applied.

FIG. 1 shows a basic configuration of a switching power supply circuit to which the present invention can be applied and on which a first embodiment of the present invention hereinafter described is based.

The switching power supply circuit shown in FIG. 1 basically adopts the configuration of the switching power supply circuit described hereinabove with reference to FIG. 30 and includes a synchronous rectification circuit formed on the secondary side to attain the improvement of the ac to dc power conversion efficiency.

Here, a relationship between such a synchronous rectification circuit as just mentioned and the ac to dc power conversion efficiency is described briefly.

First, it is known that, where a power supply circuit has a configuration wherein the switching frequency of a switching element on the primary side is variably controlled to achieve stabilization of a secondary side dc output voltage, such a phenomenon as described below occurs. In particular, where the switching frequency of the primary side is suppressed low by the stabilization control when, for example, the load is placed into a light load tendency, dc resonance current which flows through a series resonance circuit of the primary side and secondary side rectification current which flows through a rectification circuit of the secondary side do not flow continuously (current discontinuous mode).

In such a discontinuous mode condition as just described, such a current discontinuous state occurs that the secondary side rectification current flows in a shorter period of time than a period within which the primary side series resonance current flows. Where the rectification current flows in a shorter period of time in this manner, the peak level of the rectification current then becomes comparatively high, and consequently, the continuity loss of rectification diodes on the secondary side becomes comparatively high.

In the circuit described hereinabove with reference to FIG. 30, such continuity loss of rectification diodes which appears when the discontinuous mode is entered gives rise to corresponding power loss also on the secondary side.

It is described for the confirmation here that, since the level of the secondary side dc output voltage is varied not only by such a load variation as described above but also by a level variation of the commercial ac power supply AC, the stabilization control through the switching frequency variation control acts equally on the variation of the commercial ac power supply AC. Accordingly, also the level variation of the commercial ac power supply AC can make a factor of such a discontinuous mode as described above.

Thus, as a technique for reducing the power loss of the secondary side by such discontinuity loss of rectification diodes, it is known to form a synchronous rectification circuit wherein MOS-FETs of low on resistance are used for rectification.

The synchronous rectification circuit includes, for example, a resistor element for detecting an alternating voltage obtained at the secondary winding N2 (secondary windings N2A, N2B) of the isolating converter transformer PIT, and MOS-FETs are driven as rectification elements with the detected voltage. Since the MOS-FETs having low on resistance are utilized as rectification elements, the continuity loss of the rectification elements can be reduced and consequently the power loss of the secondary side can be reduced.

It is to be noted that the configuration of a synchronous rectification circuit wherein MOS-FETs are driven as rectification elements based on a result of detection by a resistor of an alternating voltage obtained at the secondary winding N2 of the isolating converter transformer PIT in this manner is hereinafter referred to as winding voltage detection system.

However, when the synchronous rectification circuit of such a winding voltage detection system as just described is in the current discontinuous mode described hereinabove, also after the charging current into the smoothing capacitor reduces to the zero level, the primary side series resonance current of the same polarity continues to flow within the discontinuous period. Therefore, also the induced voltage of the secondary winding N2 does not exhibit reversal of the polarity thereof, and within the period, the MOS-FETs are not placed fully into an off state but maintain an on state.

Since the MOS-FETs remain in an on state also after the charging current into the smoothing capacitor reduces to the zero level in this manner, within the period, current in the reverse direction flows as the rectification current, and reactive power is generated by the reverse directional current.

From this, in a conventional synchronous rectification circuit of the winding voltage detection system, although the continuity loss of the rectification elements of low on resistance is reduced, effective improvement of the power conversion efficiently cannot be achieved totally due to generation of such reactive power by reverse directional current.

Therefore, in the power supply circuit shown in FIG. 1, such a configuration as described below is used to achieve further improvement of the power conversion efficiency of a power supply circuit which includes a configuration for improving the power factor.

Referring to FIG. 1, in the power supply circuit shown, a noise filter is formed from a pair of filter capacitors CL and a common mode choke coil CMC for the line of a commercial ac power supply AC similarly as in the conventional power supply circuit described hereinabove with reference to FIG. 30.

A full-wave rectification smoothing circuit is connected as a succeeding stage of the noise filter and includes a bridge rectification circuit Di formed from rectification diodes D1 to D4, and a single smoothing capacitor Ci. The full-wave rectification circuit produces a rectified smoothed voltage Ei (dc input voltage) of a level equal to the level of the ac input voltage VAC across the smoothing capacitor Ci by full-wave rectification operation of the bridge rectification circuit Di.

Also in the power supply circuit shown in FIG. 1, a power choke coil PCH is inserted in series between the noise filter and the bridge rectification circuit Di as seen in FIG. 1.

In other words, also the circuit shown in FIG. 1 is configured so as to achieve improvement of the power factor according to the choke input system which includes such a power choke coil PCH as described above.

The current resonance converter for receiving the dc input voltage to perform switching actions includes a switching circuit formed from two switching elements Q1, Q2 each in the form of a MOS-FET connected in a half bridge connection.

Damper diodes DD1, DD2 are connected in parallel between the drains and the sources of the switching elements Q1, Q2, respectively. The anode and the cathode of the damper diode DD1 are connected to the source and the drain of the switching element Q1, respectively. Similarly, the anode and the cathode of the damper diode DD2 are connected to the source and the drain of the switching element Q2, respectively. The damper diodes DD1, DD2 are body diodes provided for the switching elements Q1, Q2, respectively.

A partial resonance capacitor Cp is connected in parallel between the drain and the source of the switching element Q2. Also in this instance, the capacitance of the partial resonance capacitor Cp and the leakage inductance L1 of a primary winding N1 of a isolating converter transformer PIT form a parallel resonance circuit (partial voltage resonance circuit). Thus, partial voltage resonance operation wherein voltage resonance occurs only when the switching elements Q1, Q2 turn off is obtained.

The power supply circuit further includes an oscillation and drive circuit 2 for driving the switching elements Q1, Q2 for switching. The oscillation and drive circuit 2 includes an oscillation circuit and a drive circuit not shown and may be formed typically from an IC for universal use. The oscillation circuit and the drive circuit of the oscillation and drive circuit 2 cooperatively generate a drive signal (gate voltage)

of a required frequency to be applied to the gates of the switching elements Q1, Q2. Consequently, the switching elements Q1, Q2 perform switching operation wherein they alternately switch on/off in a required switching frequency.

The isolating converter transformer PIT is provided to transmit a switching output of the switching elements Q1, Q2 to the secondary side.

Also in this instance, the primary winding N1 of the isolating converter transformer PIT is connected at one end thereof to a node (switching output point) between the source of the switching element Q1 and the drain of the switching element Q2 through a series connection of a primary side parallel resonance capacitor C1 so that the switching output is transmitted.

Also in the circuit shown in FIG. 1, the primary winding N1 is connected at the other end thereof to the primary side ground.

The isolating converter transformer PIT has a structure hereinafter described, and the primary winding N1 of the isolating converter transformer PIT has a required leakage inductance L1. The capacitance of the series resonance capacitor C1 and the leakage inductance L1 of the isolating converter transformer PIT form a primary side series resonance circuit for achieving operation of the current resonance type as operation of the primary side switching converter.

Thus, also in this instance, the primary side switching converter described above performs operation of the current resonance type by the primary side series resonance circuit (L1-C1) and partial voltage resonance operation by the partial voltage resonance circuit (Cp//L1) described hereinabove. Thus, the power supply circuit shown in FIG. 1 has a configuration of a composite resonance converter which includes a combination of a resonance circuit for forming a primary side switching converter as a resonance circuit of the resonance type with another resonance circuit.

Also in this instance, the secondary winding N2 of the isolating converter transformer PIT includes a secondary winding N2A and another secondary winding N2B formed across a center tap.

In the circuit shown in FIG. 1, however, a synchronous rectification circuit for full-wave rectification is provided for the secondary windings N2A, N2B. The synchronous rectification circuit includes N-channel MOS-FETs Q3, Q4, Q5, and Q6 as rectification elements as seen in FIG. 1.

A MOS-FET having, for example, a trench structure of a low voltage resisting property is selected for the MOS-FETs Q3 to Q6 so as to obtain low on resistance.

The center tap output of the secondary winding N2 of the isolating converter transformer PIT is connected through a series connection of an inductor Ld as shown in FIG. 1 to a node of the positive electrodes of smoothing capacitors C01, C02, C03, C04. In particular, a parallel connection circuit of the smoothing capacitors C01, C02, C03, C04 is connected as the smoothing capacitor for charging secondary side rectification current. It is to be noted that the reason why a plurality of smoothing capacitors are connected in parallel in this manner is that it is intended to make the circuit of FIG. 1 ready for conditions of a low voltage of a dc output voltage E0=5 V and high current of load current=30 A.

An end of the secondary winding N2 (end on the secondary winding N2B side) is connected to a node between the drain of the MOS-FET Q3 and the drain of the MOS-FET Q5. A junction of the sources of the MOS-FETs Q3, Q5 is connected to the secondary side ground.

Similarly, the other end of the secondary winding N2 (end on the secondary winding N2A side) is connected to a node between the drain of the MOS-FET Q4 and the drain of the MOS-FET Q6. A junction of the sources of the MOS-FETs Q4, Q6 is connected to the secondary side ground.

It is to be noted that body diodes DD3, DD4, DD5, DD6 are connected between the drains and the sources of the MOS-FETs Q3, Q4, Q5, Q6, respectively.

According to the connection scheme described above, the parallel connection circuit of the MOS-FETs Q3, Q5 is inserted in series in the rectification current path including the secondary winding N2B. Meanwhile, the parallel connection circuit of the MOS-FETs Q4, Q6 is inserted in series in the rectification current path including the secondary winding N2A.

Further, the inductor Ld is inserted in series between the center tap of the secondary winding N2 and the parallel connection circuit of the smoothing capacitors C01 to C04. The inductor Ld in this instance has a comparatively low inductance of, for example, approximately 0.6 µH set thereto.

Further, in the synchronous rectification circuit shown in FIG. 1, a drive circuit for driving the MOS-FETs Q3, Q5 is formed from a gate resistor Rg1 connected commonly between the end of the secondary winding N2A remote from the center tap and the gates of the MOS-FETs Q3, Q5.

Similarly, a drive circuit for driving the MOS-FETs Q4, Q6 is formed from a gate resistor Rg2 connected commonly between the end of the secondary winding N2B remote from the center tap and the gates of the MOS-FETs Q4, Q6.

In short, the MOS-FETs Q3, Q5 are both rendered conducting when an alternating voltage excited in the secondary winding N2A is detected by the gate resistor Rg1. On the other hand, the MOS-FETs Q4, Q6 are both rendered conducting when an alternating voltage excited in the secondary winding N2B is detected by the gate resistor Rg2.

If an on voltage is applied to the gate of a MOS-FET, then the drain-source becomes equivalent to a mere resistor, and therefore, current can flow in the opposite directions. If it is tried to cause the MOS-FET to function as a rectification element on the secondary side, then current must flow only in the direction in which the positive electrode of a secondary side smoothing capacitor (smoothing capacitors Co1 to Co4) is charged. If current flows in the reverse direction, then discharge current flows from the secondary side smoothing capacitor to the isolating converter transformer PIT side, and therefore, power cannot be transmitted efficiently to the load side. Further, the reverse current gives rise to generation of heat by the MOS-FET or to production of noise and also to switching loss on the primary side.

The drive circuits described above are provided for driving the MOS-FETs Q3 to Q6 to switch so that current flows only in the direction in which the positive electrode terminal of the secondary side smoothing capacitor is charged (in this instance, in the direction from the source to the drain) based on detection of the voltage of the secondary winding. In short, the synchronous rectification circuit in this instance has a circuit configuration wherein the MOS-FETs are driven to on/off in synchronism with the rectification circuit in accordance with the winding voltage detection system.

It is to be noted that, in this instance, Schottky diodes Dg1, Dg2 are connected in parallel in directions indicated in FIG. 1 to the gate resistors Rg1, Rg2 which form the driving circuit systems for the set of MOS-FETs Q3, Q5 and the set of MOS-FETs Q4, Q6, respectively. The Schottky diodes Dg1, Dg2 form paths for discharging accumulated charge of the gate input capacitors of the MOS-FETs Q3 and Q5, Q4 and Q6 upon turning off of them, respectively. Thus, the MOS-FETs Q3 and Q5, Q4 and Q6 are turned off with certainty to achieve a good switching characteristic.

Further, as described hereinabove, in the power supply circuit shown in FIG. 1, the inductor Ld is interposed between the center tap of the secondary winding N2 and the secondary side smoothing capacitor. In this instance, the inductor Ld is inserted in the rectification current path of the secondary side.

Where the inductor Ld is inserted in the rectification current path in this manner, noise which is generated in the dc output voltage E0 can be suppressed.

In particular, if the synchronous rectification circuit formed from MOS-FETs is used on the secondary side, then high frequency noise is likely to be superposed on the dc output voltage E0 by an influence of switching noise of the MOS-FETs and so forth. However, where the inductor Ld is inserted in the rectification current path in this manner, such noise components can be smoothed by the impedance component of the inductor Ld to suppress the noise components.

Further, the inductor Ld inserted in the rectification current path in this manner gives rise also to an effect that generation of reverse directional current which is likely to appear on rectification current can be suppressed as hereinafter described.

Furthermore, in the circuit of FIG. 1, a snubber circuit formed from a series connection circuit of a capacitor CS and a resistor RS is provided in parallel to the secondary winding of the isolating converter transformer PIT in such a manner as shown in FIG. 1.

In this instance, the capacitor CS side of the snubber circuit is connected to the end of the secondary winding N2B remote from the center tap. Meanwhile, the resistor RS side is connected to the end side of the secondary winding N2A remote from the center tap.

In short, according to the connection scheme described, the snubber circuit is provided in parallel also to the MOS-FETs Q3, Q5 and Q4, Q6 connected in series.

The reason why the snubber circuit is connected in parallel to the series connection circuit of the two sets of MOS-FETs in this manner is that it is intended to suppress a spike voltage which appears between the drain and the source of each MOS-FET.

In particular, a spike voltage is generated between the drain and the source of each MOS-FET by electric capacity (coss) between the drain and the source upon turning off of the MOS-FET. Such a spike voltage as just described makes an obstacle to lowering of the voltage withstanding level of each MOS-FET.

Therefore, the snubber circuit formed from the capacitor CS and the resistor RS is provided in parallel to the series connection circuit of the MOS-FETs in such a manner as described above to smooth a peak waveform of such a spike voltage as described above to achieve lowering of the voltage withstanding level between the drain and the source of each MOS-FET.

According to the synchronous rectification circuit having the circuit configuration described above, operation of charging the secondary side smoothing capacitor with rectification circuit obtained by full-wave rectification is obtained.

In particular, within one of two half periods of an alternating voltage excited in the secondary winding, current flowing through the secondary winding N2B charges the secondary side smoothing capacitor. On the other hand, within the other half period of the alternating voltage, current flowing through the secondary winding N2A charges the secondary side smoothing capacitor. From this, operation of charging the secondary side smoothing capacitor in the two half periods in which the alternating voltage exhibits positive and negative values is obtained.

Such a secondary side dc output voltage E0 as seen in FIG. 1 is obtained as the voltage across the smoothing capacitor. The secondary side dc output voltage E0 is supplied to the load side not shown and is inputted also as a detection voltage to a control circuit 1 described below.

The control circuit 1 supplies a detection output corresponding to a level variation of the secondary side dc output voltage E0 to the oscillation and drive circuit 2. The oscillation and drive circuit 2 drives the switching elements Q1, Q2 so that the switching frequency of them may vary in response to the detection output of the control circuit 1 inputted thereto. Since the switching frequency of the switching elements Q1, Q2 is varied in this manner, the power to be transmitted from the primary winding N1 of the isolating converter transformer PIT to the secondary windings N2A, N2B side is varied, and this acts to stabilize the level of the secondary side dc output voltage E0.

For example, if the load is placed into a heavy load tendency and the secondary side dc output voltage E0 drops, then the switching frequency is controlled so as to become lower thereby to raise the secondary side dc output voltage E0. On the other hand, if the load is placed into a light load tendency and the secondary side dc output voltage E0 rises, then the switching frequency is controlled so as to become higher thereby to lower the secondary side dc output voltage E0.

It is to be noted that, since, as described hereinabove, the secondary side dc output voltage E0 is placed into a tendency wherein it varies also in response to the level of the commercial ac power supply AC, such a constant voltage control operation as described above acts equally also in response to the level variation of the commercial ac power supply AC.

Here, if the synchronous rectification circuit formed from MOS-FETs of low on resistance is constructed merely on the secondary side in such a manner as described above in the circuit of FIG. 1, then a discontinuous mode is entered as described above. Consequently, reverse directional current flows at a timing at which the MOS-FETs are turned off, and therefore, reactive power on the secondary side cannot be reduced effectively.

Therefore, in the circuit of FIG. 1, the isolating converter transformer PIT is configured in such a manner as described below to expand the continuous mode to suppress such reverse directional current.

Figure 2:
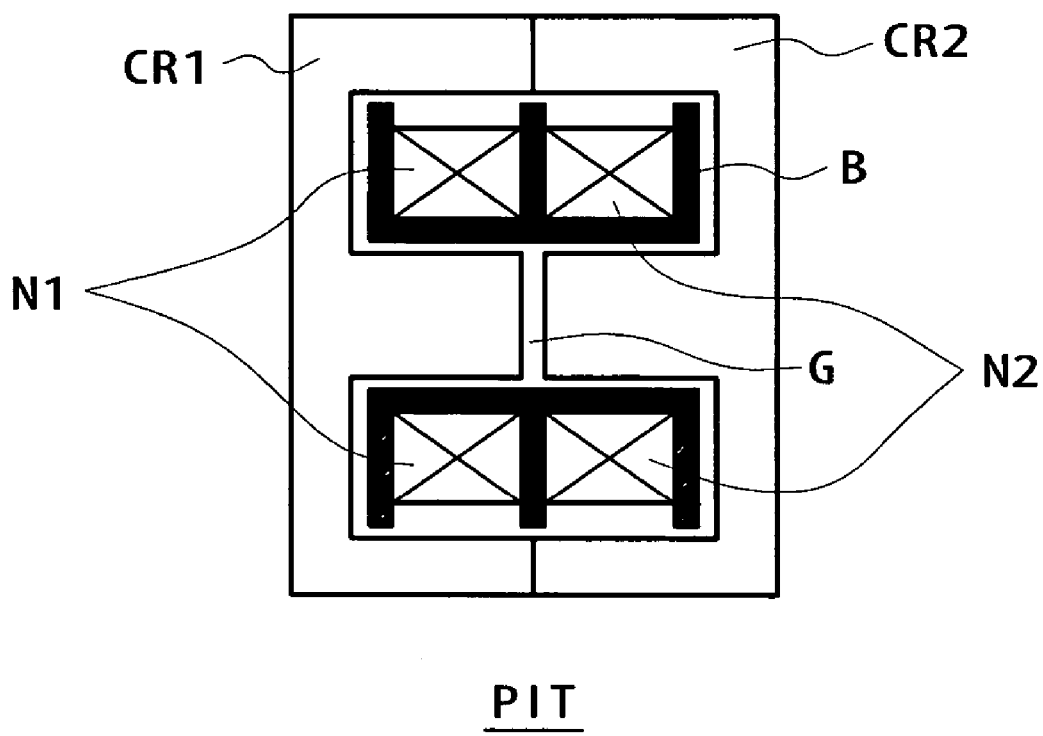
FIG. 2 is a schematic view showing an example of a structure of an insulating converter transformer provided in the power supply circuit of FIG. 1.

FIG. 2 shows an example of a structure of the isolating converter transformer PIT provided in the circuit of FIG. 1.

Referring to FIG. 2, the isolating converter transformer PIT includes an EE type core. The EE type core includes a pair of E type cores CR1, CR2 made of a ferrite material and combined in such a manner that magnetic legs thereof are opposed to each other.

The isolating converter transformer PIT further includes a bobbin B made of, for example, a resin material and formed divisionally such that a primary side winding portion and a secondary side winding portion are independent of each other. The primary winding N1 is wound on one of the winding portions while the secondary winding (N2A, N2B) is wound on the other winding portion. As the bobbin B on which the primary side winding and the secondary side winding are wound in this manner is attached to the EE type core (CR1, CR2), the primary side winding and the secondary side winding are wound in different winding regions from each other on the central magnetic leg of the EE type core. The structure of the entire isolating converter transformer PIT is obtained in this manner. The EE type core in this instance is made of, for example, EER-40.

A gap G having a gap length of, for example, approximately 1.5 mm is formed in the central magnetic leg of the EE type core in such a manner as seen in FIG. 2. By the gap G, the coupling coefficient k is set so that a loose coupling state of, for example, k=0.8 or less is obtained. In short, the isolating converter transformer PIT in the power supply circuit of FIG. 1 has a looser coupling state than the isolating converter transformer PIT of the power supply circuit shown as a conventional power supply circuit in FIG. 30. It is to be noted that the gap G can be formed by forming the central magnetic leg of each of the E type cores CR1, CR2 shorter than the other two outer magnetic legs.

Further, the numbers of turns of the primary winding N1 and the secondary windings N2A, N2B are set so that the induced voltage level per 1 T (turn) of the secondary side winding may be lower than that of the power supply circuit described hereinabove with reference to FIG. 30. For example, the numbers of turns of the primary winding N1 and the secondary windings N2A, N2B are set to N1=68 T and N2A=N2B=2 T so that the induced voltage level per 1 T (turn) of the secondary winding may be 2.5 V/T or less.

Where the numbers of turns of the primary winding N1 and the secondary winding (N2A, N2B) of the isolating converter transformer PIT are set in such a manner as described above, the magnetic flux density of the core of the isolating converter transformer PIT decreases and the leakage inductance of the isolating converter transformer PIT increases when compared with that in the power supply circuit described hereinabove with reference to FIG. 30.

Operation of the circuit shown in FIG. 1 which includes the isolating converter transformer PIT having such a configuration as described above is described with reference to a waveform diagram of FIG. 3.

Figure 3:
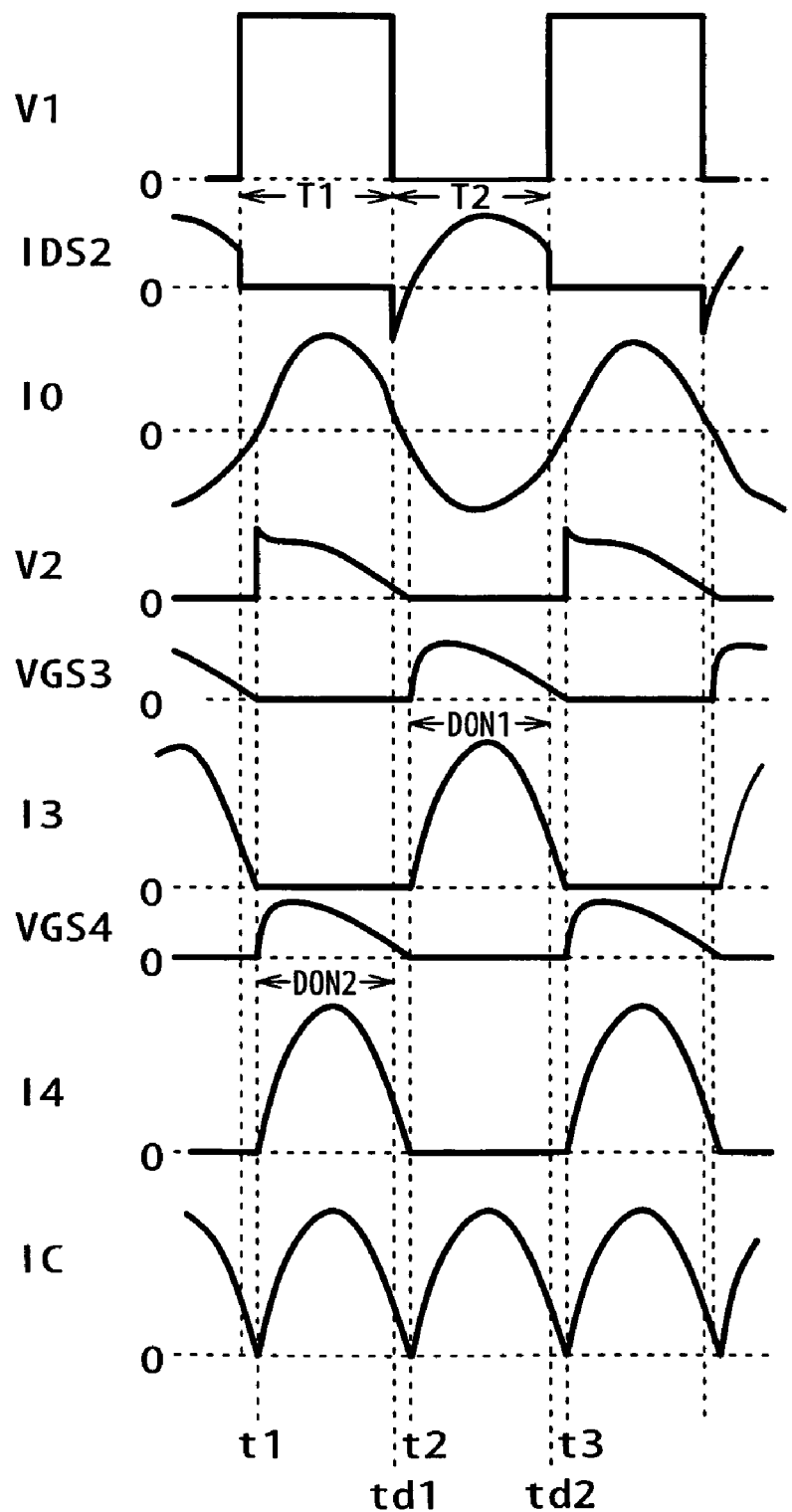
FIG. 3 is a waveform diagram illustrating operation of principal components of the power supply circuit of FIG. 1 within a switching period.

The waveform diagram of FIG. 3 illustrates operation waveforms of principal components of the power supply circuit of FIG. 1 within a switching period.

Referring to FIG. 3, the voltage V1 across the switching element Q2 corresponds to on/off states of the switching element Q2. In particular, the waveform shown in FIG. 3 exhibits a rectangular wave wherein the voltage V1 has the zero level within a period T2 within which the switching element Q2 is on but is clamped to a predetermined level within another period T1 within which the switching element Q2 is off. Then, the switching current IDS2 flowing through the switching element Q2//damper diode DD2 exhibits a waveform wherein it exhibits the negative polarity as it flows through the damper diode DD2 upon turning on of the switching element Q2 as seen within the period T2. Within the period T2, the switching current IDS2 is reversed so as to have the positive polarity, with which it flows from the drain to the source of the switching element Q2, whereafter, within the period T1, the switching element Q2 is turned off and the switching current IDS2 has the zero level.

Meanwhile, the switching element Q1 performs switching on/off alternately with respect to the switching element Q2. Therefore, though not shown, the switching current flowing through the switching element Q1//damper diode DD1 has a waveform having a phase shifted by 180° with respect to the switching current IDS2. Also the voltage across the switching element Q1 has a waveform having a phase shifted by 180° with respect to the voltage V1 across the switching element Q2.

Thus, the primary side series resonance current I0 which flows through the primary side series resonance circuit (C1-L1) connected between the switching output point of the switching elements Q1, Q2 and the primary side ground has a composite waveform of the switching current IDS1 and the switching current IDS2. Consequently, the primary side series resonance current I0 has a sine waveform as seen in FIG. 3.

It is to be noted that, in a conventional circuit wherein the isolating converter transformer PIT is not formed in a loose coupling state, the coupling coefficient k of the isolating converter transformer PIT is set to a value, for example, equal to or higher than k=0.8 so that a high magnetic flux density may be obtained by the isolating converter transformer PIT. According to the setting of the coupling coefficient k, the primary side series resonance current I0 does not exhibit a sine waveform but includes a rectangular wave component generated by the excitation inductance of the primary winding N1.

In contrast, according to the example described above, the coupling coefficient of the isolating converter transformer PIT is set to a loose coupling state level thereby to set the magnetic flux density lower than a required level as described hereinabove. Consequently, as the leakage inductance L1 of the primary winding N1 increases, the excitation inductance of the primary winding N1 can be made relatively low.

Since the excitation inductance of the primary winding N1 can be made low in this manner, a waveform of a sine wave can be obtained as the primary side series resonance current I0 as seen in FIG. 3.

The voltage V2 obtained at the secondary winding N2B has a waveform conforming with a period of such primary side series resonance current I0 as just described. In particular, the voltage V2 is obtained as a waveform having a zero cross timing coincident with the zero cross timing of the primary side series resonance current I0 (refer to times t1, t2, t3 in FIG. 3).

Whereas it is described above that the voltage V2 is a potential obtained at the secondary winding N2B, a potential is generated with a similar waveform also in the secondary winding N2A.

In the secondary side synchronous rectification circuit, the drive circuit formed from the register Rg2 detects such a voltage V2 (secondary winding N2B) as described above and outputs an on level gate voltage (gate-source voltage VGS4) to the MOS-FETs Q4, Q6.

The gate-source voltage VGS4 is generated as an on voltage within a period within which the voltage V2 keeps a level higher than a level corresponding to a predetermined level determined as a gate-source voltage for the MOS-FETs Q4, Q6 (within a period from time t1 to time td1 in FIG. 3). In other words, the period from time t1 to time td1 is an on period DON2 of the MOS-FETs Q4, Q6.

Then, a period from time td1 at which the on period DON2 ends to time t2 is dead time of the MOS-FETs Q4, Q6, and within the dead time from time td1 to time t2, rectification current flows through the body diodes DD4, DD6 for the MOS-FETs Q4, Q6.

Consequently, the rectification current I4 which is to flow through the set of the MOS-FETs Q4, Q6 flows for the period from time t1 to time t2. In other words, the rectification current I4 exhibits the zero level at timings t1 and t2 at which the primary side series resonance current I0 exhibits the zero level similarly, and consequently, the rectification current I4 is continuous to the primary side series resonance current I0.

Similarly, the drive circuit formed from the register Rg1 detects a voltage generated at the secondary winding N2A which is equivalent to the voltage V2 described above and outputs an on level gate voltage (gate-source voltage VGS3) to the MOS-FETs Q3, Q5.

Also the gate-source voltage VGS3 is generated as an on voltage within a period within which the voltage V2 generated in the secondary winding N2A keeps a level higher than a level corresponding to a predetermined level determined as a gate-source voltage for the MOS-FETs Q3, Q5 (within a period from time t2 to time td2 in FIG. 3). Thus, the period from time t2 to time td2 is an on period DON1 of the MOS-FETs Q3, Q5.

Then, a period from time td2 at which the on period DON1 ends to time t3 is dead time of the MOS-FETs Q3, Q5, and within the dead time from time td2 to time t3, rectification current flows through the body diodes DD3, DD5 for the MOS-FETs Q3, Q5.

Consequently, also the rectification current I3 which is to flow through the set of the MOS-FETs Q3, Q5 flows for the period from time t2 to time t3 which are zero-crossing timings of the primary side series resonance current I0 as seen in FIG. 3, and consequently, flows continuously to the primary side series resonance current I0.

The charging current Ic to the smoothing capacitors (smoothing capacitors C01 to C04) flows with such a waveform as seen in FIG. 3 which is obtained by combining the rectification currents I3, I4. In other words, it can be recognized that full-wave rectification operation wherein the smoothing capacitors C0 are charged within periods within each of which the voltage generated in the secondary winding N2A, N2B has any of the positive and negative polarities.

Further, since the rectification current I3 and the rectification current I4 flow continuously to the primary side series resonance current I0 as described hereinabove, also the charging current Ic to the smoothing capacitors C0 flows continuously to the primary side series resonance current Io.

In short, in the circuit of FIG. 1, a continuous mode of the secondary side rectification current is obtained also when the circuit is controlled so that the switching frequency may be set lower than a predetermined level as a result of heavy loading, for example.

Figure 30:
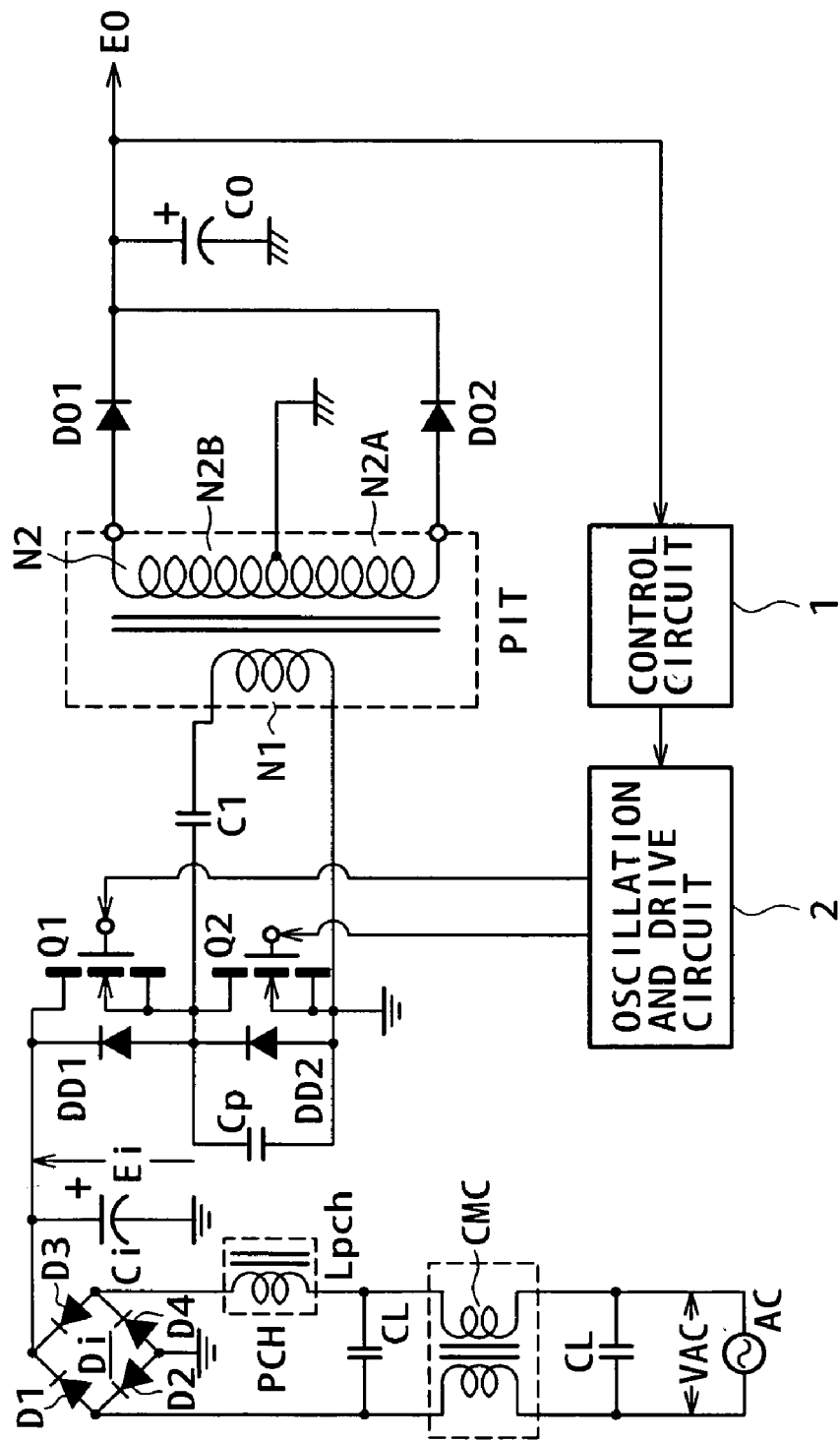
FIG. 30 is a circuit diagram showing a configuration of a conventional switching power supply circuit.

Since the continuous mode is expanded in this manner, reverse directional current within a discontinuous period is suppressed, and reactive power can be reduced and improvement of the power conversion efficiency can be anticipated when compared with that of the circuit of FIG. 30.

It is to be noted that the reason why such reverse directional current is not generated in the rectification currents I3, I4 in this instance is that the inductor Ld is interposed in the rectification current path as described hereinabove. In particular, the inductor Ld inserted in the rectification current path in this manner has an effect of suppressing reverse directional current which is generated in the rectification current by an impedance component of the inductor Ld. In this instance, if the inductance value of the inductor Ld is set, for example, to approximately 0.6 µH as described hereinabove, then reverse directional current which is generated on rectification current can be prevented.

Figure 6:
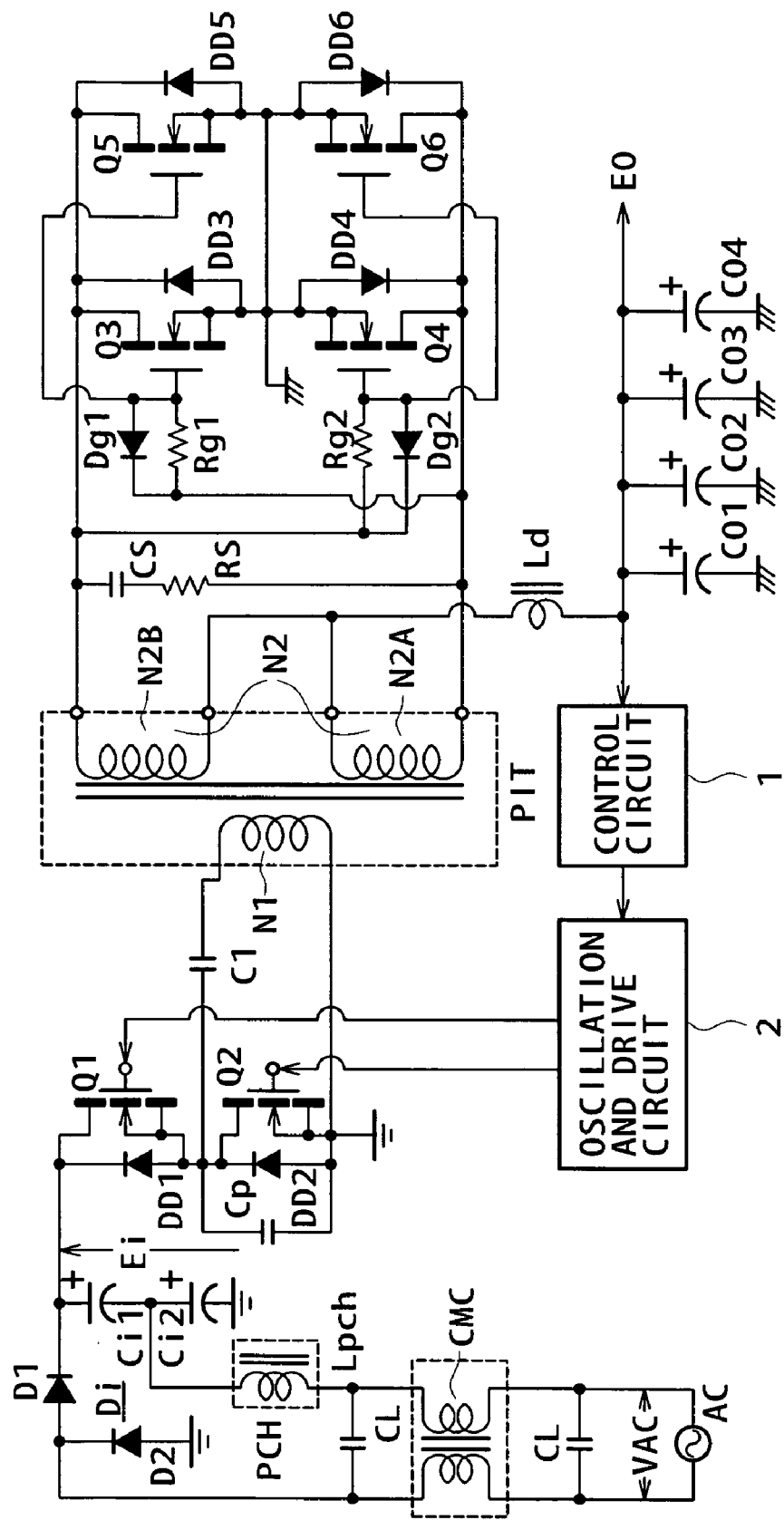
FIG. 6 is a circuit diagram showing a basic circuit configuration of a switching power supply circuit to which a second embodiment of the present invention can be applied.

FIG. 6 shows another basic configuration of a switching power supply circuit to which the present invention can be applied and on which a second embodiment of the present invention hereinafter described is based.

Also the basic configuration shown in FIG. 6 includes a power choke coil PCH to achieve improvement of the power factor similarly as in the basic configuration shown in FIG. 1 and includes an isolating converter transformer PIT having a similar configuration to that described hereinabove with reference to FIG. 2. The basic configuration shown in FIG. 6 thereby achieves expansion of the continuous mode and reduction of the reactive power on the secondary side to achieve improvement of the power conversion efficiency.

Further, the configuration shown in FIG. 6 is configured so as to be ready for an AC 100 V system while the configuration of FIG. 1 is configured so as to be ready for a 200 V system of the commercial AC power supply AC.

As the configuration ready for an AC 100 V system, the basic configuration of FIG. 6 includes a voltage doubler rectification smoothing circuit formed from a pair of rectification circuits D1, D2 and a pair of smoothing capacitors Ci1, Ci2 as a rectification smoothing circuit for rectifying and smoothing the input ac voltage to produce a dc input voltage Ei.

In the rectification smoothing circuit in this instance, the rectification diode D1 is connected in series in a direction shown in FIG. 6 in a positive electrode line of the commercial ac power supply AC as seen in FIG. 6. The smoothing capacitors Ci1, Ci2 are connected in series, and the negative electrode terminal of the smoothing capacitor Ci2 is grounded to the primary side ground while the positive electrode of the smoothing capacitor Ci1 is connected to the cathode of the rectification diode D1. A node between the smoothing capacitors Ci1, Ci2 is connected to a negative line of the commercial ac power supply AC. Further, the rectification diode D2 is inserted such that the cathode thereof is connected to the rectification diode D1 and the anode thereof is connected to the primary side ground.

According to such a configuration as described above, within a half period within which the input ac voltage exhibits the positive polarity, a rectification output of the rectification diode D1 is smoothed by the smoothing capacitor Ci1. On the other hand, within the other half period within which the input ac voltage exhibits the negative polarity, a rectification output of the rectification diode D2 is smoothed by the smoothing capacitor Ci2.

In short, in this instance, a level corresponding to twice the level of the commercial ac power supply AC is obtained as the dc input voltage Ei across the series connection circuit of the smoothing capacitors Ci1, Ci2. As a result, a level equal to the dc input voltage Ei obtained by the basic configuration of FIG. 1 can be obtained.

As can be recognized from the foregoing description, the power supply circuits shown in FIGS. 1 and 6 have a configuration for improvement of the power factor according to the choke input system similarly as in the case of the circuit described hereinabove with reference to FIG. 30 and besides the isolating converter transformer PIT is configured so as to have a magnetic flux density lower than a predetermined level. Where the magnetic flux density of the isolating converter transformer PIT is set lower than the predetermined level in this manner, expansion of the continuous mode, for example, in a heavy load condition can be achieved. Besides, reactive power by reverse directional current appearing on secondary side rectification current, which has been a problem where a synchronous rectification circuit of the winding voltage detection system is configured, can be reduced to achieve improvement of the power conversion efficiency.

However, if the power choke coil PCH is provided to achieve improvement of the power factor, then such problems as described below with reference to FIGS. 4, 5 and 7, 8 occur.

Figure 4:
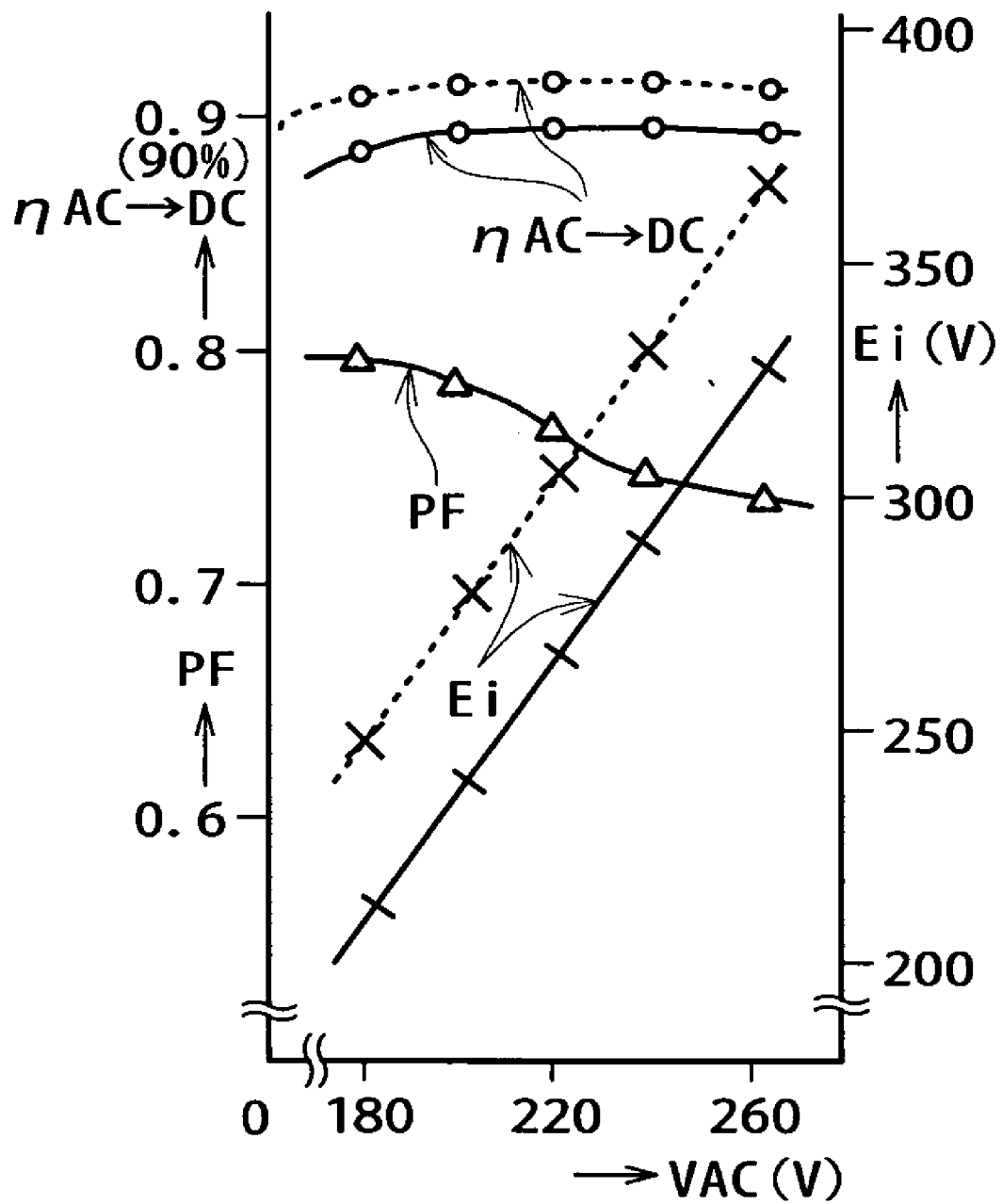
FIG. 4 is a diagram illustrating characteristics of a power factor, a power conversion efficiency, and a dc input voltage level of the power supply circuit of FIG. 1 with respect to a variation of an ac input voltage level.
Figure 5:
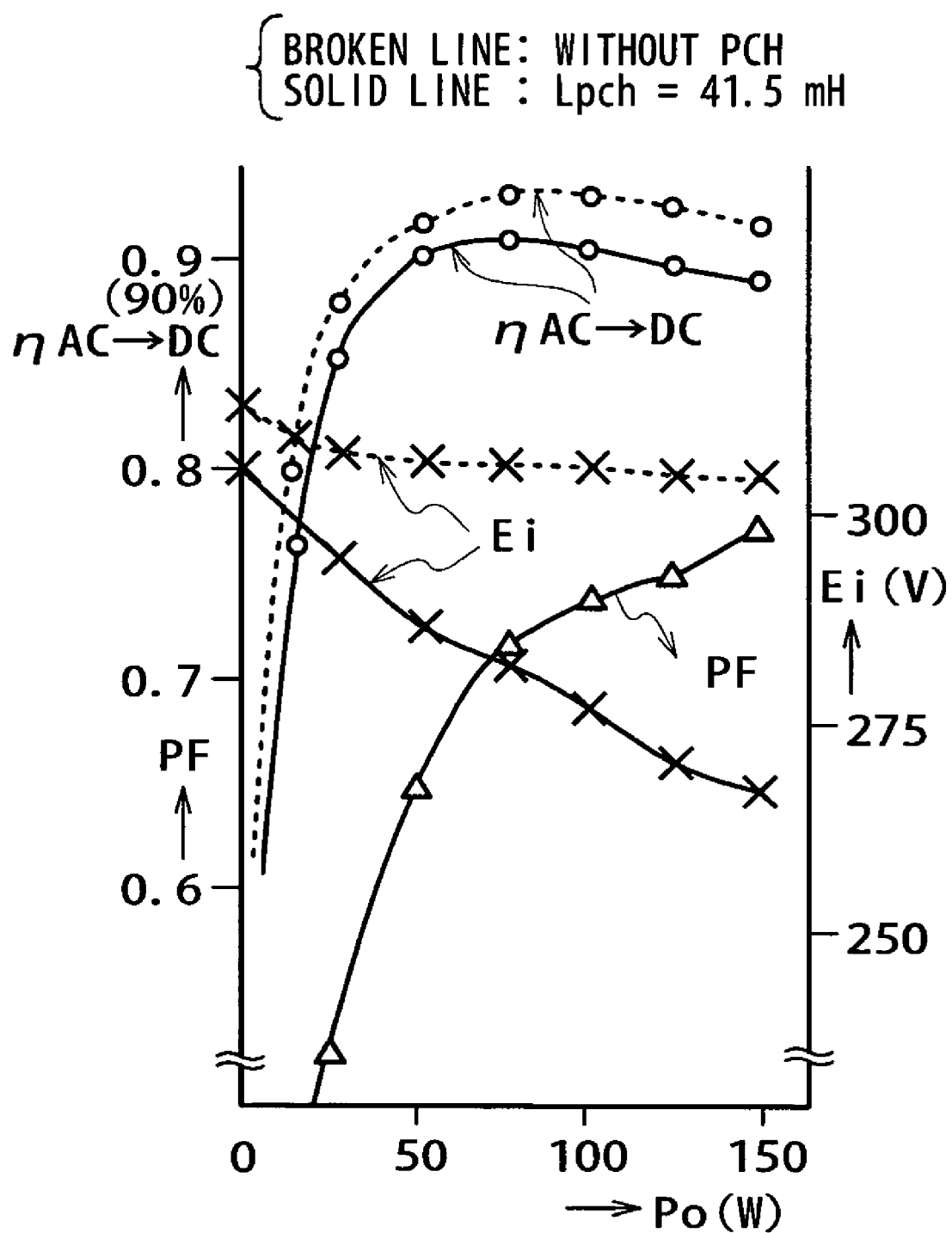
FIG. 5 is a diagram illustrating characteristics of a power factor, power conversion efficiency, and a dc input voltage level of the power supply circuit of FIG. 1 with respect to a variation of a load.
Figure 7:
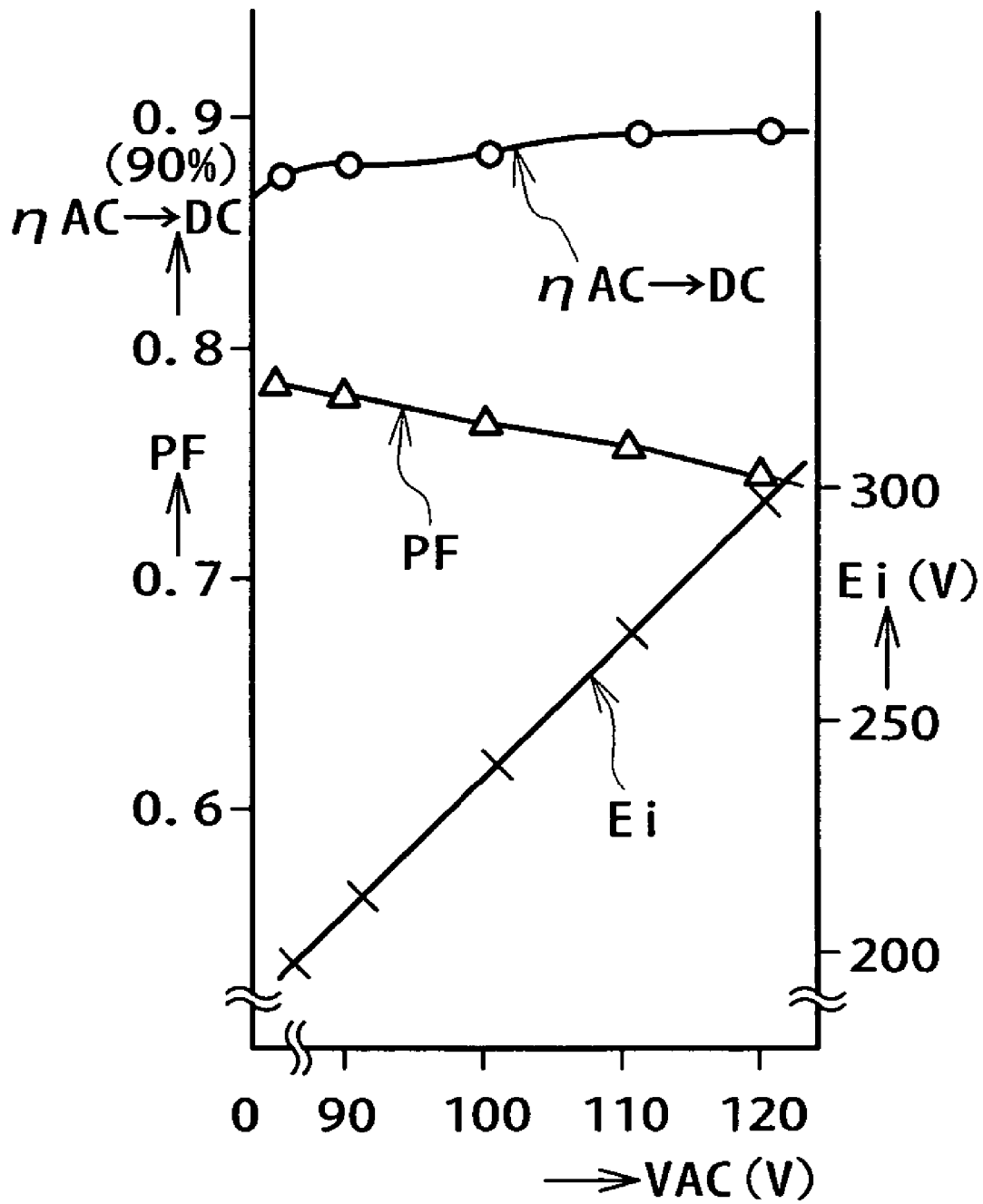
FIG. 7 is a diagram illustrating characteristics of a power factor, a power conversion efficiency, and a dc input voltage level of the power supply circuit shown in FIG. 6 with respect to a variation of an ac input voltage level.
Figure 8:
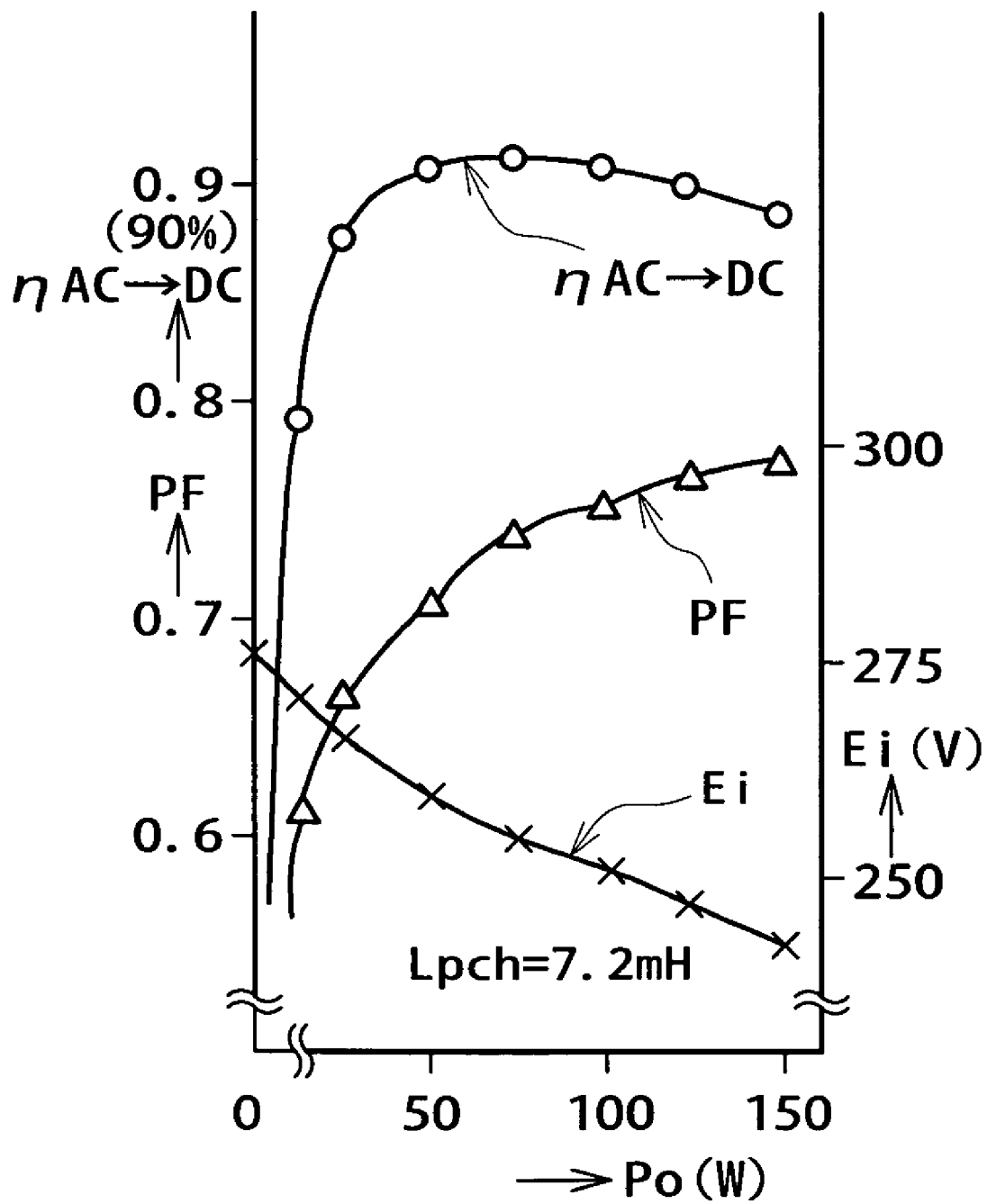
FIG. 8 is a diagram illustrating characteristics of a power factor, power conversion efficiency, and a dc input voltage level of the power supply circuit shown in FIG. 6 with respect to a variation of a load.

FIGS. 4, 5 and 7, 8 are characteristic diagrams of the circuits shown in FIGS. 1 and 6, respectively. In particular, FIGS. 4 and 7 illustrate characteristics of the AC-DC power conversion efficiency ηAC→DC, power factor PF, and dc input voltage Ei of the power supply circuits of FIGS. 1 and 6 with respect to a variation of the ac input voltage level VAC where the load power Po is fixed. FIGS. 5 and 8 illustrate characteristics of the ac-dc power conversion efficiency ηAC→DC, power factor PF, and dc input voltage Ei of the power supply circuits of FIGS. 1 and 6 with respect to a variation of the load power Po where the ac input voltage VAC is fixed.

It is to be noted that, in FIGS. 4 and 5, those characteristics of the circuit of FIG. 1 from among the characteristics other than the power factor PF are indicated by solid lines, and those characteristics where the power choke coil PCH is removed from the configuration of FIG. 1 are indicated by broken lines. Further, in FIG. 4, results of the experiment wherein the ac input voltage VAC was fixed to VAC=220 V, and in FIG. 7, results of the experiment wherein the ac input voltage VAC was fixed to VAC=100 V. Further, in FIGS. 5 and 8, results of the experiment wherein the load power Po was fixed to Po=150 W.

Further, when the results of FIGS. 4, 5 and 7, 8 were obtained, the capacitance of the primary side series resonance capacitor C1 in the circuit of FIG. 1 was set to 0.027 μH, and the capacitance of the primary side series resonance capacitor C1 in the circuit of FIG. 6 was set to 0.022 μH.

First, in the circuits of FIGS. 1 and 6, the rectified smoothed voltage Ei is dropped by approximately 10% by an impedance component of the power choke coil PCH with respect to that before the power choke coil PCH is inserted.

In particular, for example, in the case of the circuit of FIG. 1, the dc input voltage Ei (solid line in FIG. 4) varies within a range of approximately 210 to 330 V while the ac input voltage VAC ranges from 180 to 260 V. In contrast, in the case of the circuit wherein the power choke coil PCH is removed from the configuration of FIG. 1, the dc input voltage Ei (broken line) varies within another range of 250 to 370 V and indicates a drop by approximately 10% with respect to that before the power choke coil PCH is inserted.

Also in the circuit shown in FIG. 6, the level of the dc input voltage Ei drops similarly when compared with that before the power choke coil PCH is inserted.

If the dc input voltage Ei drops, then since a prescribed input voltage level cannot be obtained, the dc input voltage Ei must be raised.

In order to raise the dc input voltage Ei, in the circuit of FIG. 1, the number of turns of the primary winding N1 of the isolating converter transformer PIT is set to N1=68 T and is thus decreased, for example, from N1=75 T which is the number of turns before insertion of the power choke coil PCH so that the level of the primary side series resonance current I0 is raised as much.

Also in the case of the circuit of FIG. 6, the primary winding N1 is decreased, from example, from N1=75 T which is the number of turns before insertion of the power choke coil PCH to N1=70 T to raise the level of the primary side series resonance current I0.

However, if the primary side series resonance current I0 is increased in this manner, then, for example, the switching loss of the primary side increases, and this gives rise to a drop of the power conversion efficiency.

In addition, where the power choke coil PCH is provided, reactive power is generated by iron loss of the core and copper loss of the winding of the power choke coil PCH, and also this gives rise to a drop of the power conversion efficiency.

For example, the ac-dc power conversion efficiency ηAC→DC of the circuit shown in FIG. 1 indicates, when the ac input voltage VAC varies (within the range from 180 to 260 V), a drop to a value lower than ηAC→DC=90% although the ac-dc power conversion efficiency ηAC→DC before the insertion of the power choke coil PCH maintains a level higher than ηAC→DC=90% as seen in FIG. 4.

Further, in maximum load operation wherein the ac input voltage VAC is VAC=220 V and the load power Po is Po=150 W (secondary side dc output voltage E0=5 V×load current 30 A), the ac-dc power conversion efficiency ηAC→DC of the circuit of FIG. 1 (solid line) exhibits a drop to ηAC→DC=89.3% although the ac-dc power conversion efficiency ηAC→DC before the improvement of the power factor (broken line) in the case wherein the power choke coil PCH is not provided is ηAC→DC=approximately 91.8% as seen in FIGS. 4 and 5.

Further, also a result of the experiment was obtained that the ac input power of the circuit of FIG. 1 increases by 4.6 W when compared with that before the insertion of the power choke coil PCH.

Further, also with regard to the circuit of FIG. 6, the ac-dc power conversion efficiency ΘAC→DC indicates a drop to ηAC→DC=89.2% after the insertion of the power choke coil PCH although the ac-dc power conversion efficiency ηAC→DC is ηAC→DC=91.5% before the insertion of the power choke coil PCH as seen in FIGS. 7 and 8.

Further, also with regard to the circuit of FIG. 6, a result was obtained that the ac input voltage increases by 4.3 W.

From the foregoing, the circuits of FIGS. 1 and 6 which include the power choke coil PCH still have a problem in that effective improvement of the power conversion efficiency cannot be achieved by the configuration for improvement of the power factor.

Further, in the circuits shown in FIGS. 1 and 6, the insertion of the power choke coil PCH expands the variation width (ΔEi) of the dc input voltage Ei with respect to a load variation.

In particular, when a heavy load condition is entered and the dc input voltage Ei is placed into a decreasing tendency, an impedance component of the power choke coil PCH is obstructed from obtaining sufficient power on the commercial ac power supply. Consequently, as the load power Po rises, the level of the dc input voltage Ei drops by a great amount when compared with that before the insertion of the power choke coil PCH, for example, as seen in FIG. 5.

In the case of the circuit of FIG. 1, the variation width of the dc input voltage Ei is approximately 30 V with respect to the variation of the load power Po by Po=150 to 25 W and therefore exhibits significant expansion when compared with the variation width of 3.5 V before the insertion of the power choke coil PCH.

Meanwhile, in the case of the circuit of FIG. 6, the variation width of the dc input voltage Ei under the same conditions is 30 V and therefore exhibits expansion by a great amount from the variation width of 7.5 V before the insertion of the power choke coil PCH.

In this manner, if the variation width of the dc input voltage Ei expands, then the control range of the switching frequency by operation of the constant voltage control system including the control circuit 1 expands.

If the control range of the switching frequency expands, then this gives rise to such problems that the burden imposed on the switching elements Q1, Q2 increases as much and that the configuration of, for example, the control and drive circuit system is complicated.

Further, in this instance, since the power choke coil PCH has a comparatively great size and a comparatively high weight among various components of the power supply circuit, it provides a problem also in that the occupied area of a board is great and also the weight of the circuit increases.

For example, while the circuit of FIG. 1 is configured so as to be ready for an AC 200 V system, the inductance Lpch of the power choke coil PCH in this instance is set to approximately 41.5 mH, and the weight of the power choke coil PCH in this instance is set to approximately 155 g.

Meanwhile, in the case of the circuit of FIG. 6, the inductance Lpch of the power choke coil PCH is set to 7.2 mH, and the weight in this instance is approximately 155 g.

It is to be noted that, in the circuits shown in FIGS. 1 and 6, the power factor PF when the load power Po is Po=150 W is set to approximately PF=0.77 by such setting of the inductance Lpch of the power choke coil PCH as described above.

<First Embodiment>

Taking such problems as described above into consideration, a switching power supply circuit according to a first embodiment of the present invention having a configuration for improving the power factor is configured in the following manner.

Figure 9:
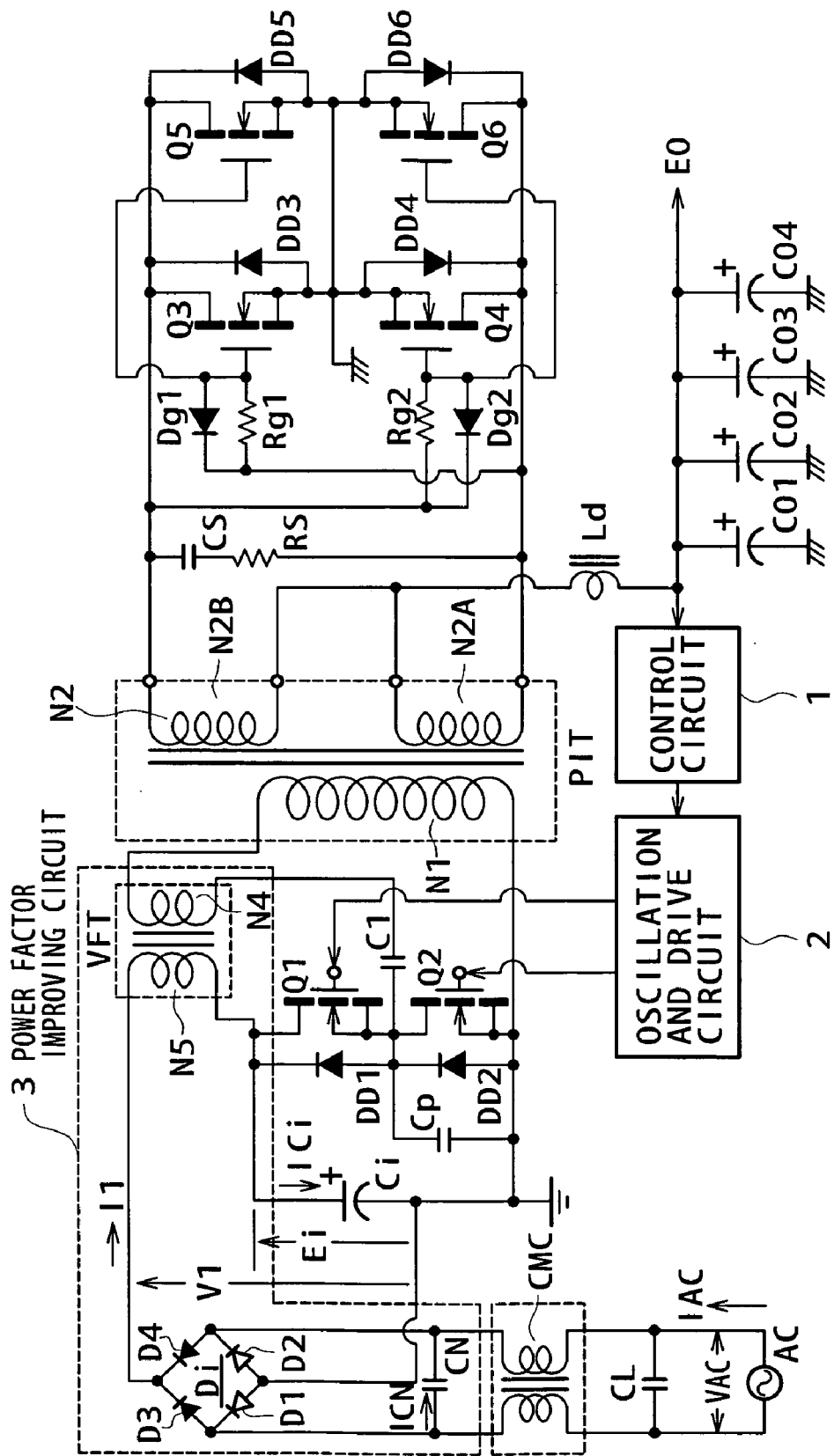
FIG. 9 is a circuit diagram showing an example of a configuration of a switching power supply circuit according to a first embodiment of the present invention.

FIG. 9 shows an example of a configuration of a switching power supply circuit which is ready for an AC 200 V system similarly to the circuit described hereinabove with reference to FIG. 1.

Referring to FIG. 1, the switching power supply circuit according to the first embodiment of the present invention includes a synchronism rectification circuit formed from MOS-FETs Q3 to Q6 on the secondary side and further includes an isolating converter transformer PIT having a configuration similar to that described hereinabove with reference to FIG. 2. Consequently, the switching power supply circuit suppresses reverse directional current of secondary side rectification current to achieve improvement of the power conversion efficiency.

In addition, the switching power supply circuit eliminates such a power choke coil PCH as is provided in the circuit of FIG. 1 and includes such a power factor improving circuit 3 as shown in FIG. 9 as a configuration for improving the power factor.

The power factor improving circuit 3 includes a bridge rectification circuit Di formed from rectification diodes D1, D2, D3, D4 as seen in FIG. 9. The power factor improving circuit 3 further includes a filter capacitor CN inserted in parallel between a negative electrode input terminal (node between the rectification diodes D1, D3) and a positive electrode input terminal (node between the rectification diodes D2, D4) of the bridge rectification circuit Di and in parallel to a line of a commercial ac power supply AC.

Further, the power factor improving circuit 3 includes a voltage feedback transformer VFT. Further, the transformer VFT includes a secondary winding N5 connected to a node between the rectification diodes D3, D4 of the bridge rectification circuit Di and a primary winding N4 interposed between the primary winding N1 of the isolating converter transformer PIT and a primary side series resonance capacitor C1.

The node between the rectification circuits D1, D2 of the bridge rectification circuit Di is connected to the negative electrode terminal of the smoothing capacitor Ci. The node between the smoothing capacitor Ci and the rectification circuits D1, D2 is connected to the primary side ground.

The secondary winding N5 of the voltage feedback transformer VFT is connected at an end thereof to the node between the rectification diodes D3, D4 of the bridge rectification circuit Di and at the other end thereof to the positive electrode terminal of the smoothing capacitor Ci through the drain of the switching element Q1.

In operation of the power factor improving circuit 3, in order for the bridge rectification circuit Di to supply rectification current so that switching may be performed in conformity with a switching period as hereinafter described, a rectification diode of the high speed recovery type is selectively used for the rectification diodes of the bridge rectification circuit Di. In particular, a rectification diode of the high speed recovery type is selectively used for two or more rectification diodes including a combination of one of sets of the rectification circuits D1, D2, rectification diodes D3, D4, rectification diodes D1, D3, and rectification diodes D2, D4.

In FIG. 9, each rectification diode of the high speed recovery type is indicated by a black-painted diode mark while each rectification diode of the low speed type is indicated by a blank diode mark. Here, an example wherein a diode of the high speed recovery type is selectively used for the rectification diodes D3, D4 of the bridge rectification circuit Di is shown in FIG. 9.

Figure 10:
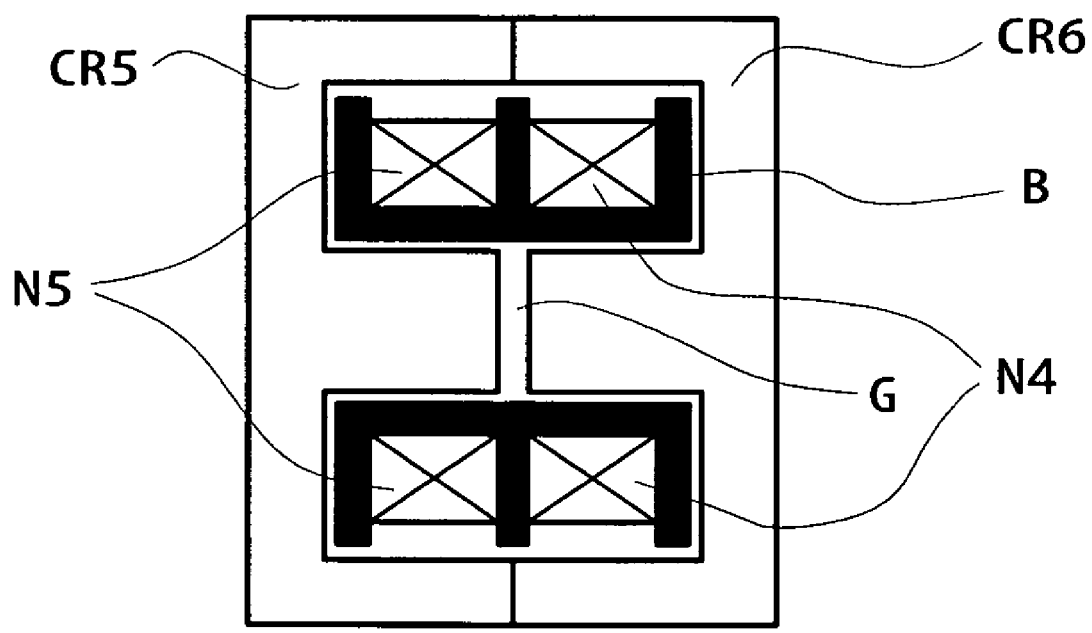
FIG. 10 is a schematic sectional view showing an example of a structure of a voltage feedback transformer provided in the switching power supply circuit of FIG. 9.

The voltage feedback transformer VFT described hereinabove has, for example, such a structure as shown in FIG. 10.

Referring to FIG. 10, the voltage feedback transformer VFT includes an EE type core. The EE type core includes a pair of E type cores CR5, CR6 made of a ferrite material and combined in such a manner that magnetic legs thereof are opposed to each other as seen in FIG. 10. The voltage feedback transformer VFT further includes a bobbin B having a primary side winding region and a secondary side winding region divided such that they are independent of each other but integrated with each other. The primary winding N4 and the secondary winding N5 are wound in the primary and secondary side winding regions, respectively.

Also the voltage feedback transformer VFT formed in this manner has a gap G formed in the central leg of the core thereof. The gap G in this instance is set to Gap=approximately 1.2 mm so that a loose coupling state wherein the coupling coefficient is approximately 0.7 to 0.8 is obtained.

Operation of the switching power supply circuit of the first embodiment having the configuration described above is described below with reference to a waveform diagram of FIG. 11.

Figure 11:
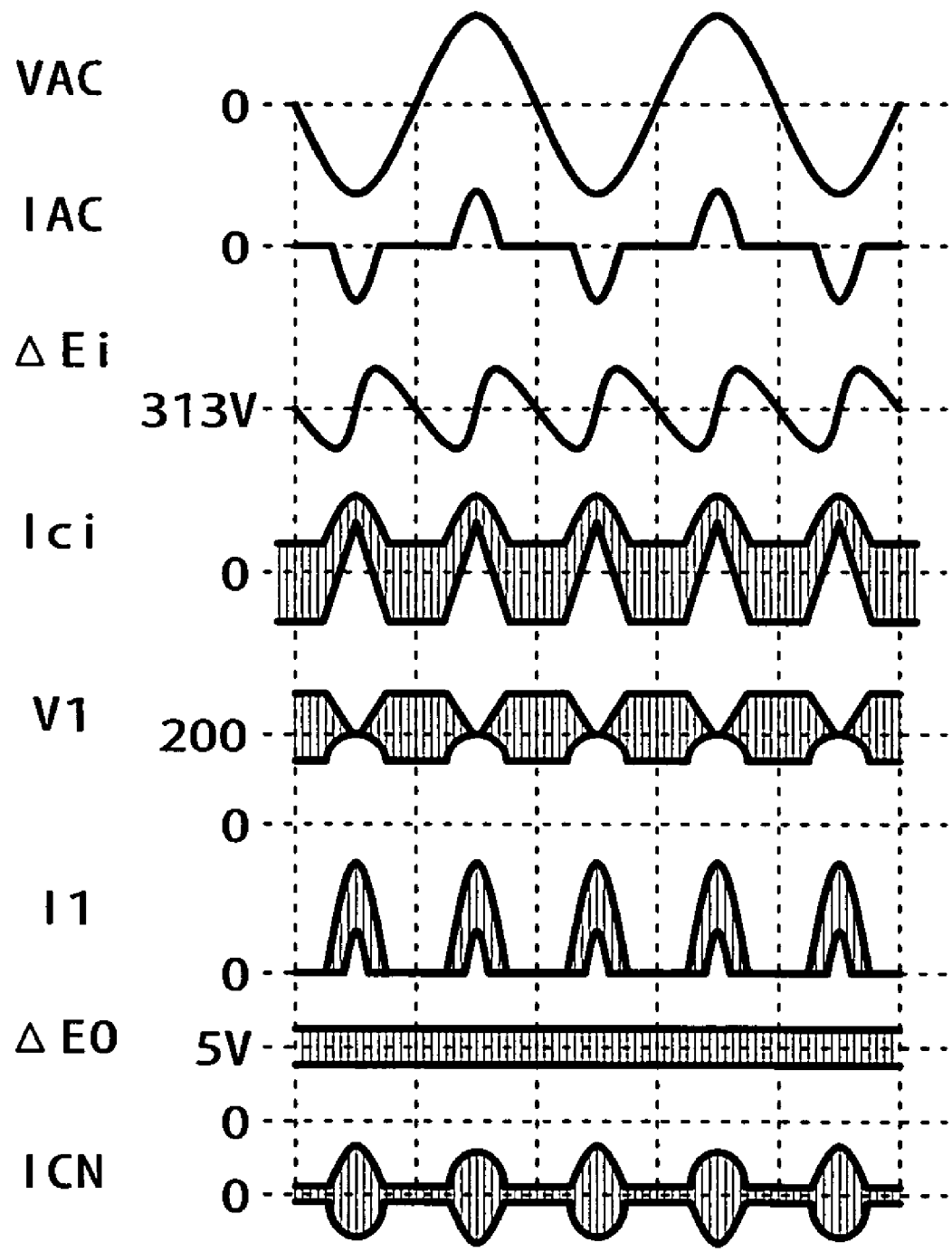
FIG. 11 is a waveform diagram illustrating operation of principal components of the power supply circuit of FIG. 9 within a period of a commercial ac power supply.

It is to be noted that, in FIG. 11, operation of several components of the circuit of FIG. 9 is illustrated within a period of the commercial ac power supply AC. Further, in FIG. 11, a result of an experiment wherein the ac input voltage VAC was VAC=220 V and the load power Po was Po=150 W is illustrated.

If it is assumed that the ac input voltage VAC inputted has, for example, such a waveform as seen in FIG. 11, then the ac input current IAC flows with such a waveform that it exhibits the positive and negative polarities within periods within which the ac input voltage VAC has the positive and negative polarities, respectively.

In this instance, alternating current I1 flows in the power factor improving circuit 3 such that it has the positive polarity within both half periods of the ac input voltage VAC as seen in FIG. 11 along a rectification current path hereinafter described.

An alternating voltage based on a primary side switching output obtained at the primary winding N4 is excited in the secondary winding N5 of the voltage feedback transformer VFT. This is indicated also by the fact that the alternating current I1 has a waveform on which high frequency components of the switching period are superposed as seen in FIG. 11.

Also the charging current ICi which flows through the power factor improving circuit 3 into the smoothing capacitor Ci has a waveform which has a period same as the switching period as seen in FIG. 11 and exhibits a peak level of the positive polarity in response to a period at which the alternating current I1 exhibits a peak level of the positive polarity.

Also the full-wave rectification voltage V1 of the bridge rectification circuit Di (potential obtained between the node between the rectification diodes D3, D4 and the node between the rectification circuits D1, D2) has a waveform which has a period same as the switching period and exhibits a peak level of the positive polarity corresponding to a period at which the alternating current I1 and the charging current ICi exhibit values proximate to the zero level.

Furthermore, the current ICN to flow into the filter capacitor CN has a waveform which has a period same as the switching period and exhibits a peak level corresponding to the period at which the alternating current I1 and the charging current ICi exhibit values proximate to peak levels of the positive polarity.

Thus, the ac input current IAC described above flows with a waveform which exhibits a peak level corresponding to a period in which the alternating current I1, charging current ICi and current ICN have values proximate to their peak levels.

It is to be noted that a result was obtained that the ripple component ΔEi of the dc input voltage Ei which is a voltage across the smoothing capacitor Ci has a waveform which repeats increase and decrease in a period corresponding to the period of the commercial ac power supply around 313 V as seen in FIG. 11, and the range of variation of the ripple component ΔEi is approximately ±5 V. Meanwhile, a ripple component ΔE0 of the secondary side dc output voltage E0 varies within a range of approximately 50 mV around 5 V in the switching period as seen in FIG. 11.

In the circuit shown in FIG. 9, within one of two half periods within which the ac input voltage VAC has the positive polarity, rectification current flows along a path of the [rectification diode D4→secondary winding N5 of the voltage feedback transformer VFT→smoothing capacitor Ci→rectification diode D1→filter capacitor CN].

Within the other half period within which the ac input voltage VAC has the negative polarity, rectification current flows along another path of the [rectification diode D3→secondary winding N5→smoothing capacitor Ci→rectification diode D2→filter capacitor CN].

It can be recognized from such rectification current paths as just described that, in the circuit of FIG. 9, within a half period within which the ac input voltage VAC has the positive polarity, rectification operation is performed by the set of rectification diodes D1, D4 of the bridge rectification circuit Di. On the other hand, within another half period within which the ac input voltage VAC has the negative polarity, rectification operation is performed by the set of rectification diodes D2, D3.

In this instance, since a rectification diode of the high speed recovery type is used for the rectification diodes D3, D4 in the bridge rectification circuit Di as described hereinabove, a rectification diode of the high speed recovery type is inserted in each of the rectification current flow paths formed within the two different half periods of the ac input voltage VAC.

In this instance, the full-wave rectification voltage V1 of the bridge rectification circuit Di has a waveform on which an alternating voltage of the switching period excited in the secondary winding N5 of the voltage feedback transformer VFT is superposed as described hereinabove. Since such a full-wave rectification voltage V1 as just described is obtained, it can be recognized that the bridge rectification circuit Di performs switching operation of the rectification diodes in the switching period.

In other words, in the power factor improving circuit 3, the voltage of the primary side switching output is fed back to the rectification current path and an alternating voltage based on the switching output is utilized to cause the rectification diodes of the bridge rectification circuit Di to perform switching operation.

Where the rectification diodes perform switching operation in a period conforming with the switching period in this manner, also within a period within which the waveform level of a low frequency component of the full-wave rectification voltage V1 corresponding to the commercial ac power supply period is higher than the level of the ac input voltage VAC, the diodes of the high speed recovery type can be rendered conducting as the level of high frequency components superposed on the full-wave rectification voltage V1 becomes lower.

In particular, within this period, the diodes of the high speed recovery type switch on and off in response to the potential difference generated by the switching period waveform superposed on the full-wave rectification voltage V1. Consequently, even within a period within which the potential of the full-wave rectification voltage V1 originally is higher than the potential of the ac input voltage VAC, rectification current can be supplied.

In other words, also within a period within which the potential of the ac input voltage VAC originally is lower than the voltage across the smoothing capacitors Ci1, Ci2, rectification current flows, and consequently, the period within which rectification current flows can be further expanded.

Where the period within which rectification current flows can be expanded, an average waveform of an ac input current component approaches the waveform of the ac input voltage VAC, and consequently, the conduction angle of the ac input current IAC is expanded thereby to achieve improvement of the power factor.

It is described for the confirmation here that the reason why the waveform of the ac input current IAC is smoothed in this instance is that high frequency components superposed on the rectification current component have been removed by the filter capacitor CN provided on the AC line.

Further, as can be recognized from the foregoing description, since two rectification diodes in the bridge rectification circuit Di perform rectification operation in each of half periods of the ac input voltage VAC, also it is a possible idea to use a rectification diode of the high speed recovery type also for the other rectification diodes, whereby a rectification diode of the high speed recovery type is used for all of the rectification diodes of the bridge rectification circuit Di. However, since a diode of the high speed recovery type is comparatively expensive, the production cost for the circuit increases as much.

In the present example, since a diode of the high speed recovery type is used for at least one of two rectification diodes inserted in each rectification current path as described above, the other rectification diode (low speed diode) can be turned on thereby to realize a power factor improving operation by the voltage feedback system. According to the present example having the configuration just described, the cost of the bridge rectification circuit Di can be suppressed by using a rectification diode of the high speed recovery type at least only for two rectification diodes.

Figure 12:
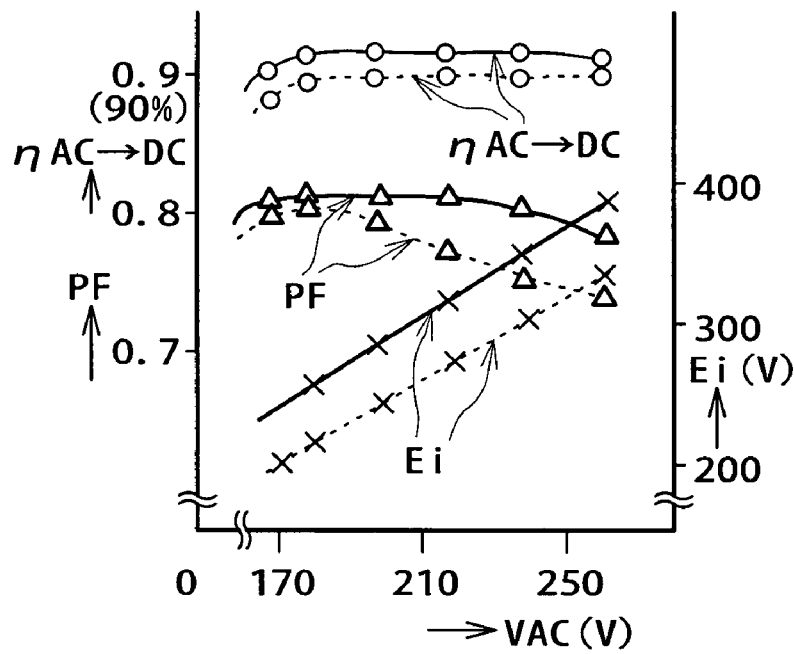
FIG. 12 is a diagram illustrating characteristics of a power factor, a power conversion efficiency, and a dc input voltage level of the power supply circuit of FIG. 9 with respect to a variation of an ac input voltage level.
Figure 13:
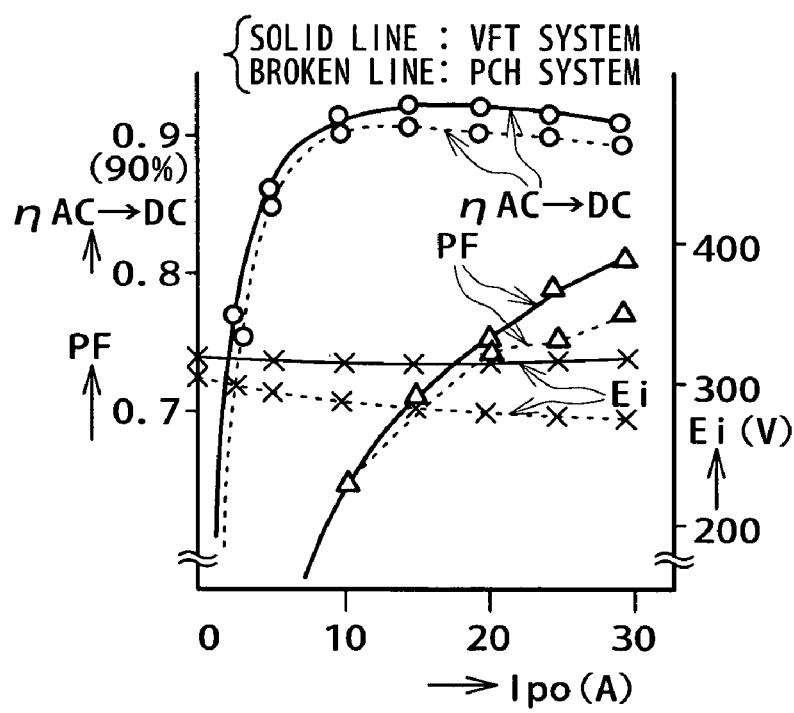
FIG. 13 is a diagram illustrating characteristics of a power factor, power conversion efficiency, and a dc input voltage level of the power supply circuit of FIG. 9 with respect to a variation of a load.

FIGS. 12 and 13 illustrate characteristics of the power supply circuit having the configuration shown in FIG. 9. Particularly, FIG. 12 illustrates characteristics of the ac to dc power conversion efficiency $\Theta AC \rightarrow DC$, power factor PF and dc input voltage Ei within a range of variation of the ac input voltage VAC of VAC=170 to 264 V where the load power Po is fixed to Po=150 W.

Meanwhile, FIG. 13 is a characteristic diagram when the load power Po varies while the ac input voltage VAC is fixed to VAC=220 V and illustrates characteristics of the AC to DC power conversion efficiency $\Theta AC \rightarrow DC$, power factor PF and dc input voltage Ei within a range of variation of the load current IPo of IPo=30 to 0 A.

It is to be noted that, in FIGS. 12 and 13, characteristics in the case of the circuit of FIG. 9 are indicated by solid lines and characteristics in the case of the circuit of FIG. 1 are indicated by broken lines.

It is to be noted that the results of the experiment illustrated in FIGS. 12 and 13 were obtained using the following constants of the components of the circuit shown in FIG. 9:

Isolating converter transformer PIT: ferrite core of EER-40, gap length Gap=1.5 mm
 Primary winding N1=75 T (turns)
 Secondary winding N2 (N2A+N2B): 2 T+2 T across dividing position at center tap
Voltage feedback transformer VFT: ferrite core of EE-25, gap length Gap=1.2 mm
 Primary winding N4=37 T
 Secondary winding N5=29 T
Primary side series resonance capacitor C1=0.015 µF.

First, it can be recognized from the characteristic diagram of FIG. 12 that the dc input voltage Ei of the circuit of the example of FIG. 9 exhibits a higher level than that of the circuit of FIG. 1 over a range of the ac input voltage VAC=170 to 264 V.

This indicates that, in the present example, since the power choke coil PCH can be omitted, the drop of the dc input voltage Ei is prevented.

Where the drop of the dc input voltage Ei is prevented in this manner, since it is not necessary to reduce the number of turns of the primary winding N1 of the isolating converter transformer PIT to increase the primary side series resonance current I0, it is possible to reduce the switching loss, for example, from that in the case of the circuit of FIG. 1 and improve the power conversion efficiency as much.

In addition, according to the circuit of FIG. 9, since the loss by the power choke coil PCH itself originating from iron loss of the core and copper loss of the winding does not appear, reduction of the reactive power can be achieved also thereby.

From the reasons, the ac to dc power conversion efficiency $\eta AC \rightarrow DC$ of the circuit of the present example shown in FIG. 9 is $\Theta AC \rightarrow DC$=approximately 91.3% as seen in FIGS. 12 and 13 where the ac input voltage VAC and the load power Po are VAC=220 V and Po=150 W (E0× IPo=5 V×30 A), respectively. This indicates an improvement of approximately 2.0% when compared with $\eta AC \rightarrow DC$=89.3% in the case of the circuit of FIG. 1 under the same conditions.

Further, it can be seen from FIG. 13 that the variation width of the dc input voltage Ei with respect to the load variation is reduced from that in the case of the circuit of FIG. 1 as seen from the broken line curve.

This arises from the fact that the power choke coil PCH can be eliminated and from the fact that, according to the configuration shown in FIG. 9, also the level of the power fed back to the rectification current path by the voltage feedback transformer VFT varies in response to the level variation of the primary side series resonance current I0 by the load variation.

In particular, in this instance, for example, if a heavy load condition is entered and the level of the primary side series resonance current I0 rises, then also the power to be fed to the rectification current path through the voltage feedback transformer VFT increases. Since charging current to the smoothing capacitor Ci is supplied from the power fed back in this manner, even when a heavy load condition is entered, the drop of the dc input voltage Ei is suppressed.

According to an experiment, the range of variation of the dc input voltage Ei with respect to the variation of the load power Po of Po=150 to 25 W in the circuit of FIG. 9 is approximately 6.0 V, and is reduced significantly when compared with the variation range of approximately 30 V in the case of the circuit of FIG. 1.

Since the variation width of the dc input voltage Ei is reduced in this manner, reduction of the control range of the switching frequency is achieved. This gives rise to advantages that, for example, the load to the switching elements Q1, Q2 is reduced and that the configuration of the driving and control circuit system for the switching elements Q1, Q2 can be simplified.

Further, As seen in FIGS. 12 and 13, according to the circuit of FIG. 9, the power factor PF of approximately 0.810 is obtained where the ac input voltage VAC and the load power Po are VAC=220 V and Po=150 W, respectively. In short, a result that the power factor PF exhibits improvement from PF=0.77 which is obtained with the circuit of FIG. 1 is obtained.

Further, since a ferrite core, for example, of the EE-25 type or the like as described hereinabove can be used for the voltage feedback transformer VFT in the circuit of the embodiment shown in FIG. 9, the element necessary for improvement of the power factor can be reduced in size and weight when compared with those of the power choke coil PCH (41.5 mH) provided in the circuit of FIG. 1.

More particularly, the weight of the voltage feedback transformer VFT in the case of the circuit of FIG. 9 is approximately 26 g, and can be reduced to approximately ⅙ when compared with 155 g of the power choke coil PCH provided in the circuit of FIG. 1.

Since the element provided for improvement of the power factor can be reduced in size and weight in this manner, the area and the weight of the circuitry can be reduced when compared with those of the circuit of FIG. 1.

From the foregoing, according to the configuration of the switching power supply circuit of the present embodiment, while expansion of the continuous mode is achieved by setting of the magnetic flux density of the isolating converter transformer PIT similarly as in the case of the circuit of FIG. 1, the reactive power of the secondary side can be reduced when compared with that of the related art circuit described hereinabove with reference to FIG. 30.

Besides, since the power factor improving circuit 3 of the voltage feedback system is configured, omission of the power choke coil PCH can be achieved, and also in this regard, further reduction of the reactive power can be anticipated.

<Second Embodiment>

Figure 14:
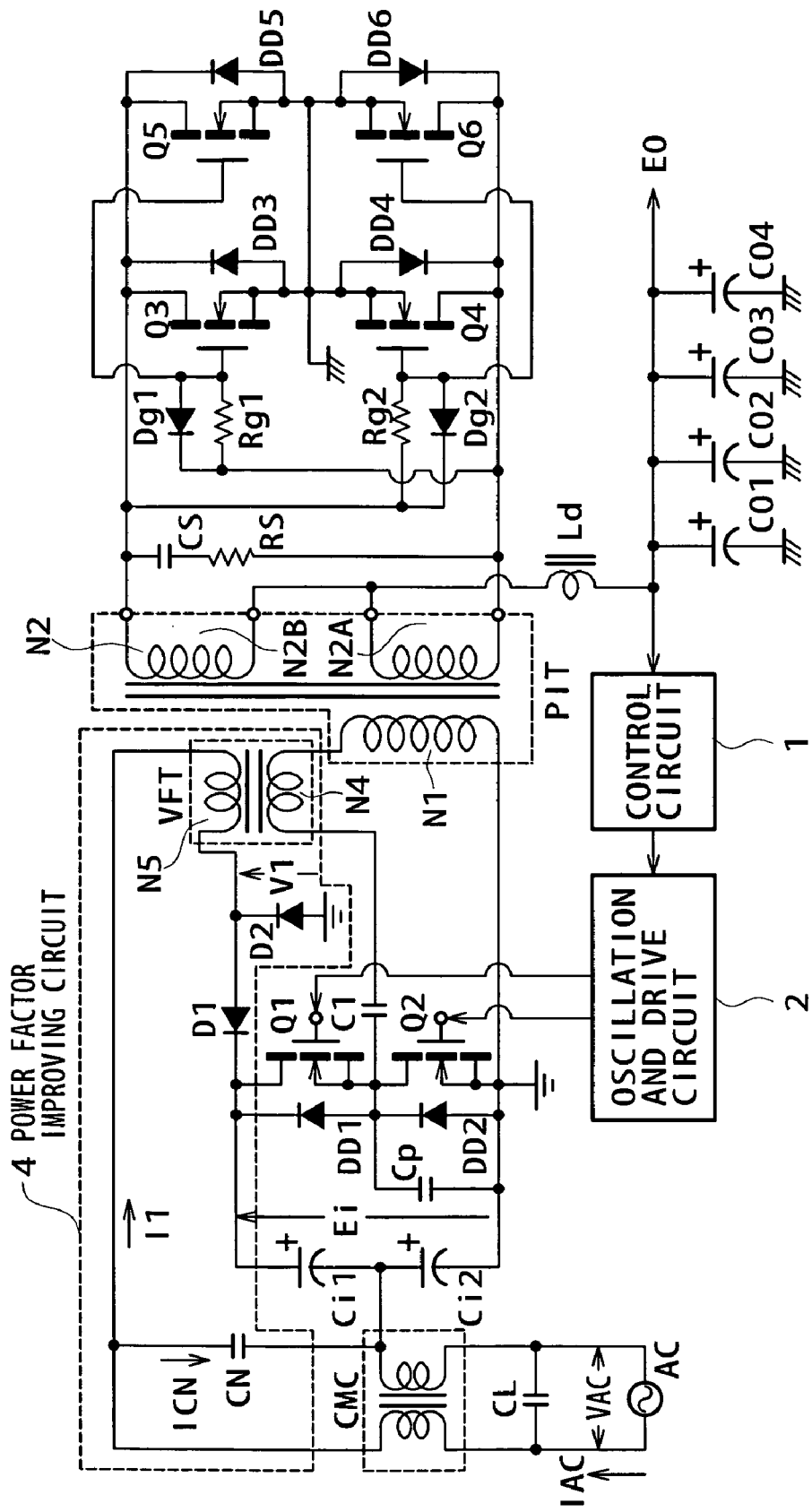
FIG. 14 is a circuit diagram showing an example of a configuration of a switching power supply circuit according to a second embodiment of the present invention.

A configuration of a switching power supply circuit according to a second embodiment of the present invention is shown in FIG. 14.

The switching power supply circuit of the second embodiment has the basic configuration ready for an AC 100 V system described hereinabove with reference to FIG. 6 and further includes a power factor improving circuit of the voltage feedback system similarly as in the first embodiment.

Referring to FIG. 14, the switching power supply system includes, as a configuration for the AC 100 V system, a voltage doubler rectification smoothing circuit formed from a pair of rectification circuits D1, D2 and a pair of smoothing capacitors Ci1, Ci2 similarly as in the circuit described hereinabove with reference to FIG. 6.

A secondary winding N5 of a voltage feedback transformer VFT is connected at an end thereof to a positive electrode line of the commercial ac power supply AC as seen in FIG. 14. A negative electrode line of the commercial ac power supply AC is connected to a node between the smoothing capacitors Ci1, Ci2.

Also in the circuit of FIG. 14, a filter capacitor CN is connected in parallel to the line of the commercial ac power supply AC.

A rectification diode D1 is connected at the anode thereof to the other end of the secondary winding N5. A rectification diode D2 is inserted in series between the node between the secondary winding N5 and the rectification diode D1 and the primary side ground. The rectification diode D2 is connected at the anode thereof to the primary side ground and at the cathode thereof to the node between the secondary winding N5 and the rectification diode D1.

The cathode of the rectification diode D1 is connected to the positive electrode terminal of the smoothing capacitor Ci1 through the drain of a switching element Q1.

A power factor improving circuit 4 in this instance includes the voltage feedback transformer VFT, filter capacitor CN and rectification circuits D1, D2.

It is to be noted that a rectification diode of the high speed recovery type is selectively used for the rectification circuits D1, D2.

Operation of the circuit having such a configuration as described above with reference to FIG. 14 is described with reference to a waveform diagram of FIG. 15.

Figure 15:
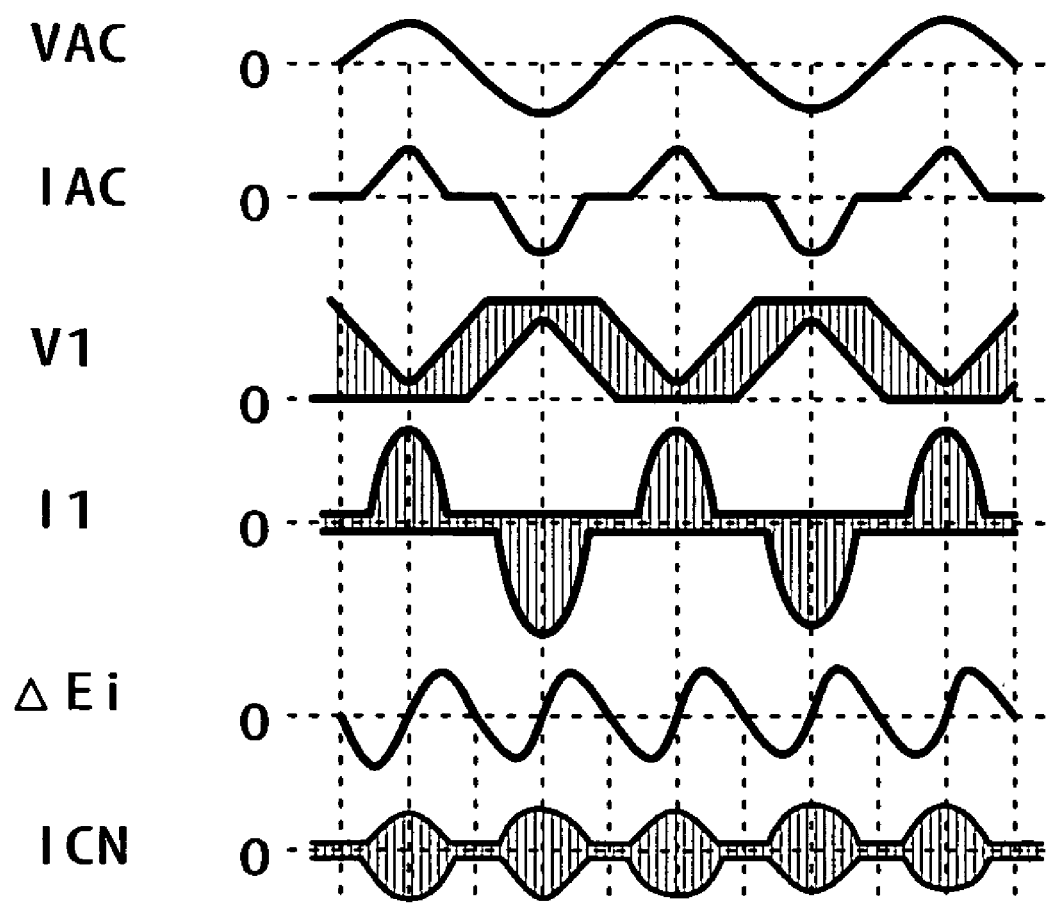
FIG. 15 is a waveform diagram illustrating operation of principal components of the power supply circuit of FIG. 14 within a period of a commercial ac power supply.

It is to be noted that, also in FIG. 15, operation of the components of the circuit of FIG. 14 is indicated within a period of the commercial ac power supply AC and illustrates a result of an examination wherein the ac input voltage VAC and the load power Po were VAC=100 V and Po=150 W, respectively.

Referring to FIG. 15, the ac input voltage VAC in this instance has such a waveform as seen in FIG. 15 in conformity with the AC 100 V system. Then, the ac input current IAC flows with such a waveform that it exhibits the positive and negative polarities within periods within which the ac input voltage VAC has the positive and negative polarities, respectively.

Also in this instance, alternating current I1 flows in the power factor improving circuit 4 such that it has high frequency components of the switching period superposed thereon. In particular, an alternating voltage based on a primary side switching output excited in the secondary winding N5 from the primary winding N4 of the voltage feedback transformer VFT is fed back to the power factor improving circuit 4 side.

It is to be noted that the alternating current I1 in this instance has a waveform which exhibits the positive and negative polarities within periods within which the ac input voltage VAC exhibits the positive and negative polarity as seen in FIG. 15, respectively, along a rectification current path hereinafter described.

The full-wave rectification voltage V1 which is a voltage across the rectification diode D2 shown in FIG. 14 has a waveform of the switching period as seen in FIG. 15, and has a low frequency component corresponding to the period of the commercial ac power supply. The Low frequency component has a waveform which exhibits a peak level of the positive polarity within a half period within which the ac input voltage VAC has the negative polarity but exhibits reversal to the zero level side within the other half period within which the ac input voltage VAC has the positive polarity.

Also the current ICN flowing into the filter capacitor CN has a waveform of the switching period which exhibits a peak level corresponding to a period within which the alternating current I1 described above exhibits a peak level.

It is to be noted that also the ripple component ΔEi of the dc input voltage Ei in this instance has such a waveform as seen in FIG. 15 and varies within a range of approximately ±5 V.

In the circuit shown in FIG. 14, within one of two half periods within which the ac input voltage VAC has the positive polarity, rectification current flows along a path of the [secondary winding N5 of the voltage feedback transformer VFT→rectification diode D1→smoothing capacitor Ci1→filter capacitor CN].

Within the other half period within which the ac input voltage VAC has the negative polarity, rectification current flows along another path of the [smoothing capacitor Ci2→rectification diode D2→secondary winding N5→filter capacitor CN].

In this manner, in the circuit shown in FIG. 14, within a half period within which the ac input voltage VAC has the positive polarity, rectification operation is performed by the rectification diode D1. On the other hand, within another half period within which the ac input voltage VAC has the negative polarity, rectification operation is performed by the rectification diode D2. Also in this instance, since a rectification diode of the high speed recovery type is used for the rectification circuits D1, D2, the rectification diodes perform switching operation of the switching period based on an alternating voltage excited in the secondary winding N5 of the voltage feedback transformer VFT.

Where the rectification diodes perform switching operation within the switching period in this manner, also within a period within which the level of the ac input voltage VAC originally is lower than the voltage across the smoothing capacitors Ci1, Ci2, the diodes of the high speed recovery type are rendered conducting in response to the waveform of the superposed waveform of the switching period. Consequently, also within the period mentioned, charging current can be supplied to the smoothing capacitor Ci.

In particular, also in this instance, within a period within which the potential of the ac input voltage VAC originally is lower than the voltage across the smoothing capacitors Ci1, Ci2, the diodes of the high speed recovery type conduct, and consequently, the period within which rectification current flows can be further expanded.

In this manner, also in the circuit shown in FIG. 14, since the period within which rectification current flows can be expanded, the average waveform of the ac input current component approaches the waveform of the ac input voltage VAC. This expands the conduction angle of the ac input current IAC thereby to achieve improvement of the power factor.

Figure 16:
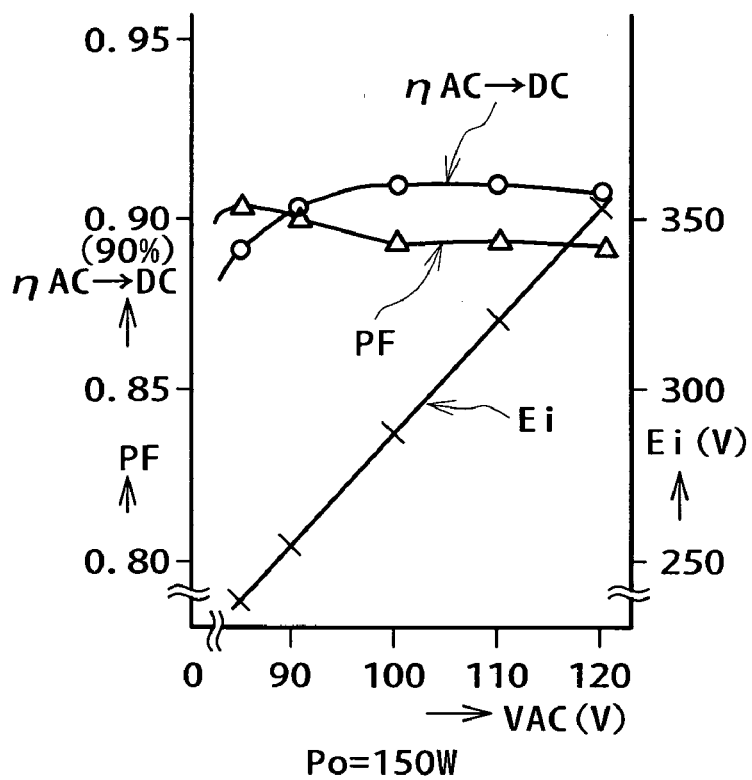
FIG. 16 is a diagram illustrating characteristics of a power factor, a power conversion efficiency, and a dc input voltage level of the power supply circuit of FIG. 14 with respect to a variation of an ac input voltage level.
Figure 17:
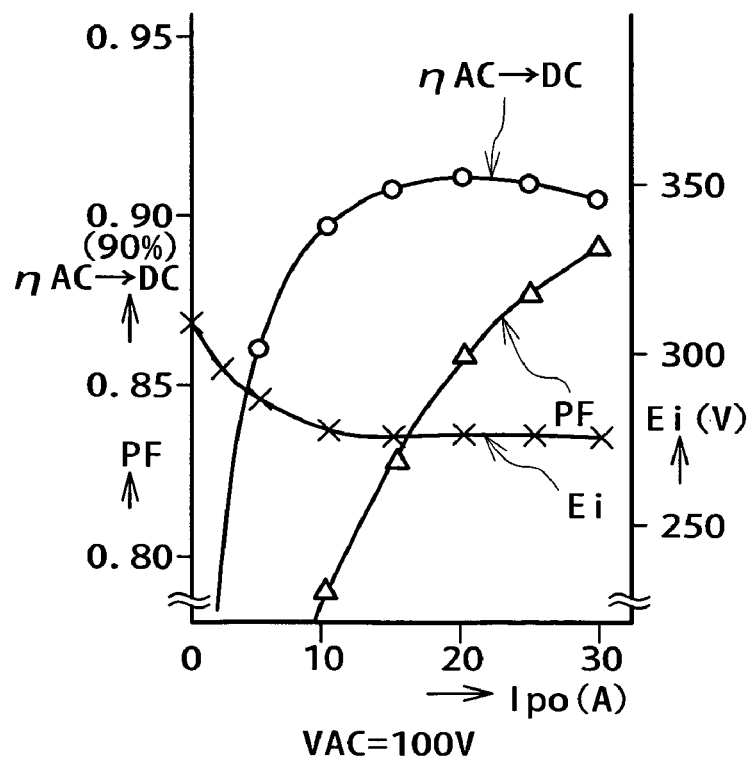
FIG. 17 is a diagram illustrating characteristics of a power factor, power conversion efficiency, and a dc input voltage level of the power supply circuit of FIG. 14 with respect to a variation of a load.

FIGS. 16 and 17 illustrate characteristics of the power supply circuit having the configuration shown in FIG. 14.

Particularly, FIG. 16 illustrates characteristics of the ac to dc power conversion efficiency ηAC→DC, power factor PF and dc input voltage Ei within range of variation of the ac input voltage VAC of VAC=85 to 120 V where the load power Po is fixed to Po=150 W. Meanwhile, FIG. 17 is a characteristic diagram when the load power Po varies while the ac input voltage VAC is fixed to VAC=100 V and illustrates characteristics of the ac to dc power conversion efficiency ηAC→DC, power factor PF and dc input voltage Ei within a range of variation of the load current IPo of IPo=30 to 0 A.

It is to be noted that the, also in this instance, results of the experiment illustrated in FIGS. 16 and 17 were obtained using the following constants of the components of the circuit shown in FIG. 14:

Isolating converter transformer PIT: ferrite core of EER-40, gap length Gap=1.5 mm
  Primary winding N1=75 T (turns)
  Secondary winding N2 (N2A+N2B): 2 T+2 T across dividing position at center tap
Voltage feedback transformer VFT: ferrite core of EE-25, gap length Gap=1.2 mm
  Primary winding N4=37 T
  Secondary winding N5=19 T
Primary side series resonance capacitor C1=0.020 µF.

First, it can be recognized from the characteristic diagram of FIG. 16 that the dc input voltage Ei also of the circuit shown in FIG. 14 exhibits a high level over a range of the ac input voltage VAC=85 to 120 V when compared with the characteristics of the circuit of FIG. 6 described hereinabove with reference to FIG. 7. This indicates that, also in the second embodiment, since the power choke coil PCH can be omitted, the drop of the dc input voltage Ei is prevented.

Where the drop of the dc input voltage Ei is prevented in this manner, the necessity to reduce the number of turns of the primary winding N1 of the isolating converter transformer PIT to increase the primary side series resonance current I0 is eliminated, and it is possible to improve the power conversion efficiency as much.

Thus, the ac to dc power conversion efficiency ηAC→DC obtained by the circuit shown in FIG. 14 is ηAC→DC=approximately 90.9% as seen in FIGS. 16 and 17 where the ac input voltage VAC and the load power Po are VAC=100 V and Po=150 W (E0×IPo=5 V×30 A), respectively. This indicates improvement of approximately 1.7% when compared with ηAC→DC=89.2% in the case of the circuit of FIG. 6 under the same conditions.

Further, it can be seen from comparison of FIG. 17 with FIG. 8 that the variation width of the dc input voltage Ei of the circuit of FIG. 14 with respect to the load variation is reduced from that in the case of the circuit of FIG. 6.

In particular, also in this instance, since the power fed back through the voltage feedback transformer VFT varies in response to a load variation, the variation of the level of the dc input voltage Ei with respect to the load variation is suppressed similarly as in the first embodiment.

According to an experiment, the range of variation of the dc input voltage Ei with respect to the variation of the load power Po of Po=150 to 25 W in the circuit of FIG. 14 is approximately 16 V, and is reduced significantly when compared with the variation range of approximately 30 V in the case of the circuit of FIG. 6.

Consequently, also in this instance, reduction of the switching frequency control range can be achieved.

Further, as seen in FIGS. 16 and 17, according to the circuit shown in FIG. 14, the power factor PF of approximately 0.895 is obtained where the ac input voltage VAC and the load power Po are VAC=100 V and Po=150, respectively. In short, a result that the power factor PF exhibits improvement from PF=0.77 which is obtained with the circuit of FIG. 6 is obtained.

Further, also in the circuit shown in FIG. 14, the voltage feedback transformer VFT can be formed with a reduced size and weight when compared with the power choke coil PCH similarly as in the first embodiment.

For example, the weight of the voltage feedback transformer VFT in the case of the circuit of FIG. 14 is approximately 26 g. Consequently, also in this instance, the weight of the voltage feedback transformer VFT can be reduced to approximately 1/6 when compared with 155 g of the power choke coil PCH provided in the circuit of FIG. 1.

In this manner, also the power supply circuit of the second embodiment can achieve improvement of the power conversion efficiency and the power factor, reduction of the range of the switching frequency control and reduction in size and weight of the choke coil when compared with an alternative configuration which includes the power choke coil PCH as a configuration for improvement of the power factor.

<Third Embodiment>

Figure 18:
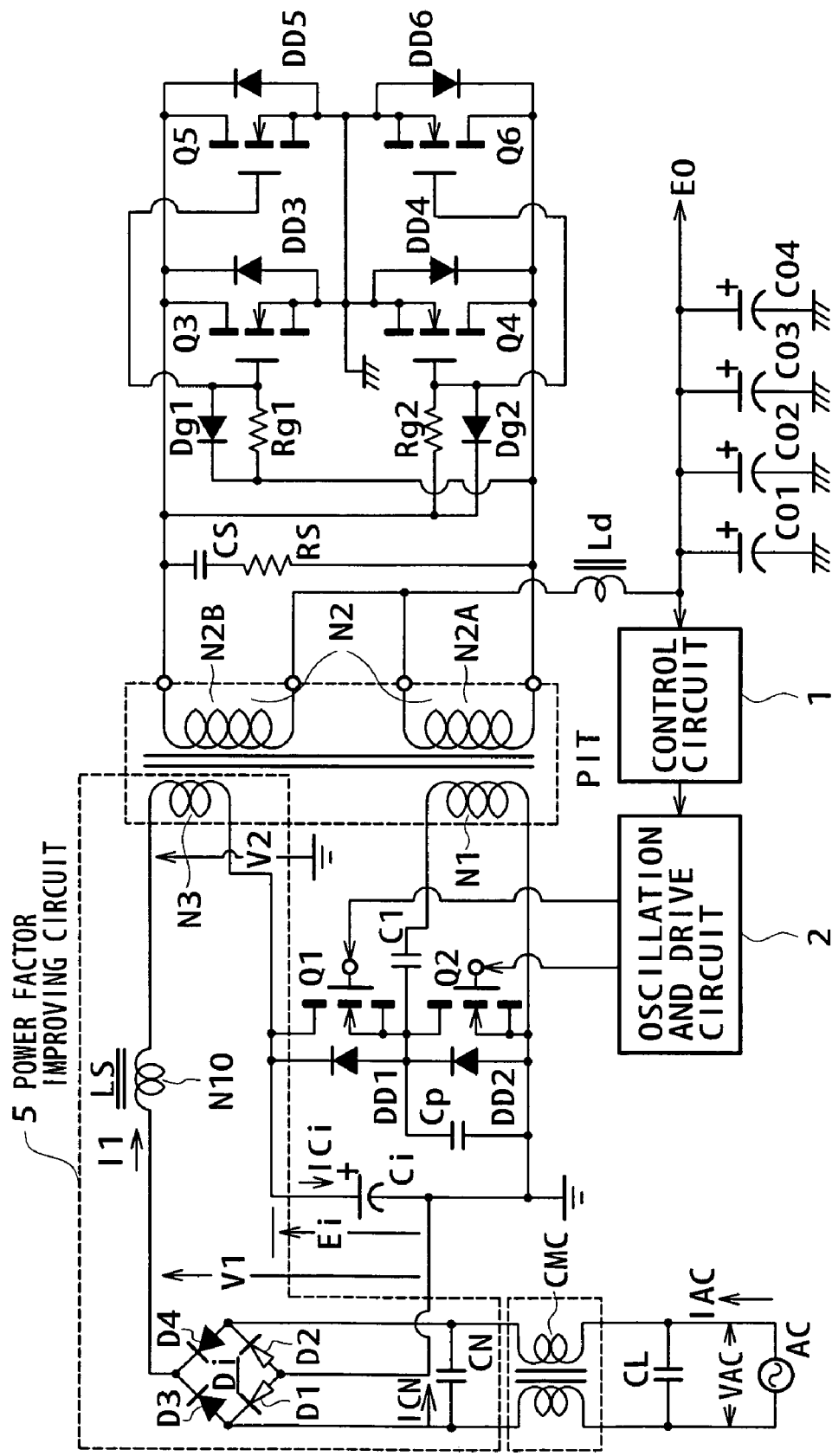
FIG. 18 is a circuit diagram showing a configuration of a switching power supply circuit according to a third embodiment of the present invention.

A configuration of a switching power supply circuit according to a third embodiment of the present invention is shown in FIG. 18.

The switching power supply circuit of the third embodiment has the basic configuration ready for an ac 200 V system similarly to the first embodiment described hereinabove with reference to FIG. 9. The switching power supply circuit further includes a power factor improving circuit 5 different from the power factor improving circuit 3 provided in the circuit of FIG. 9 as a power factor improving circuit of the voltage feedback system.

Accordingly, the power supply circuit shown in FIG. 18 is similar to the circuit of FIG. 9 except the configuration of the power factor improving circuit, and therefore, the following description is given principally of the configuration of the power factor improving circuit 5.

The power factor improving circuit 5 includes a bridge rectification circuit Di formed from rectification diodes D1, D2, D3, D4 as seen in FIG. 18. The power factor improving circuit 5 further includes a filter capacitor CN inserted in parallel between a negative electrode input terminal (node between the rectification diodes D1, D3) and a positive electrode input terminal (node between the rectification diodes D2, D4) of the bridge rectification circuit Di and in parallel to a line of a commercial ac power supply AC.

Further, the power factor improving circuit 5 includes a high frequency choke coil LS connected to a node between the rectification diodes D3, D4 of the bridge rectification circuit Di and a tertiary winding N3 wound on the primary side of an isolating converter transformer PIT.

Also in this instance, the node between the rectification circuits D1, D2 of the bridge rectification circuit Di is connected to the negative electrode terminal of the smoothing capacitor Ci. The node between the smoothing capacitor Ci and the rectification circuits D1, D2 is connected to the primary side ground.

The high frequency choke coil LS is connected at an end of a winding N10 thereof to the node between the rectification diodes D3, D4 of the bridge rectification circuit Di and at the other end of the winding N10 thereof to an end of the tertiary winding N3. The tertiary winding N3 is connected at the other end thereof to the positive electrode terminal of the smoothing capacitor Ci through the drain of the switching element Q1.

It is to be noted that, also in this instance, a rectification diode of the high speed recovery type is selectively used for suppressing the circuit cost. The high speed recovery type is used one of two rectification diodes inserted in each of two rectification current paths for two different half periods among the rectification diodes which form the bridge rectification circuit Di.

In short, also in FIG. 18, an example is shown wherein a diode of the high speed recovery type is selectively used for the rectification diodes D3, D4 each indicated as a black-painted diode.

Figure 19:
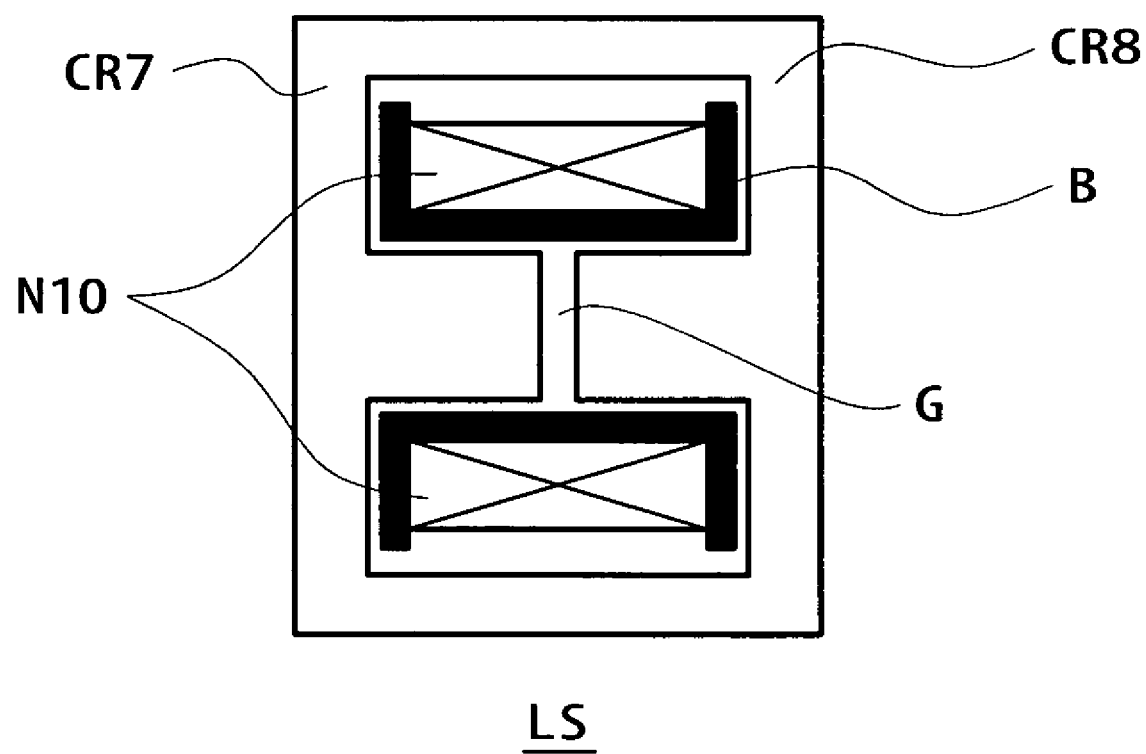
FIG. 19 is a schematic sectional view showing an example of a structure of a high frequency choke coil provided in the switching power supply circuit of FIG. 18.

The high frequency choke coil LS mentioned above has, for example, such a structure as shown in FIG. 19.

Referring to FIG. 19, the high frequency choke coil LS includes an EE type core. The EE type core includes a pair of E type cores CR7, CR8 made of a ferrite material and combined in such a manner that magnetic legs thereof are opposed to each other. The high frequency choke coil LS further includes a bobbin B made of, for example, a resin material and provided in the EE type core formed in such a manner as just described. Further, a winding N10 is wound on a winding portion of the bobbin B as seen in FIG. 19.

A gap G is formed in the central magnetic leg of the EE type core also of the high frequency choke coil LS in such a manner as seen in FIG. 19. The gap G in this instance is formed with a gap length of, for example, approximately 1.0 mm.

The high frequency choke coil LS having the structure described is formed such that the inductance value thereof is set, for example, to approximately 115 µH.

Referring back to FIG. 18, the isolating converter transformer PIT provided in the power supply circuit shown has a structure described hereinabove with reference to FIG. 2 but further has the tertiary winding N3 wound on the primary side together with the primary winding N1.

In this instance, the numbers of turns of the primary winding N1, secondary winding N2, and tertiary winding N3 of the isolating converter transformer PIT are set to N1=80 T, N2 (N2A+N2B)=2 T+2 T, and N3=15 T so that the induced voltage level per 1 turn of the secondary winding also in this instance may be approximately 2.5 V/T.

Operation of the switching power supply circuit of the third embodiment having the configuration described above is described below with reference to a waveform diagram of FIG. 20.

Figure 20:
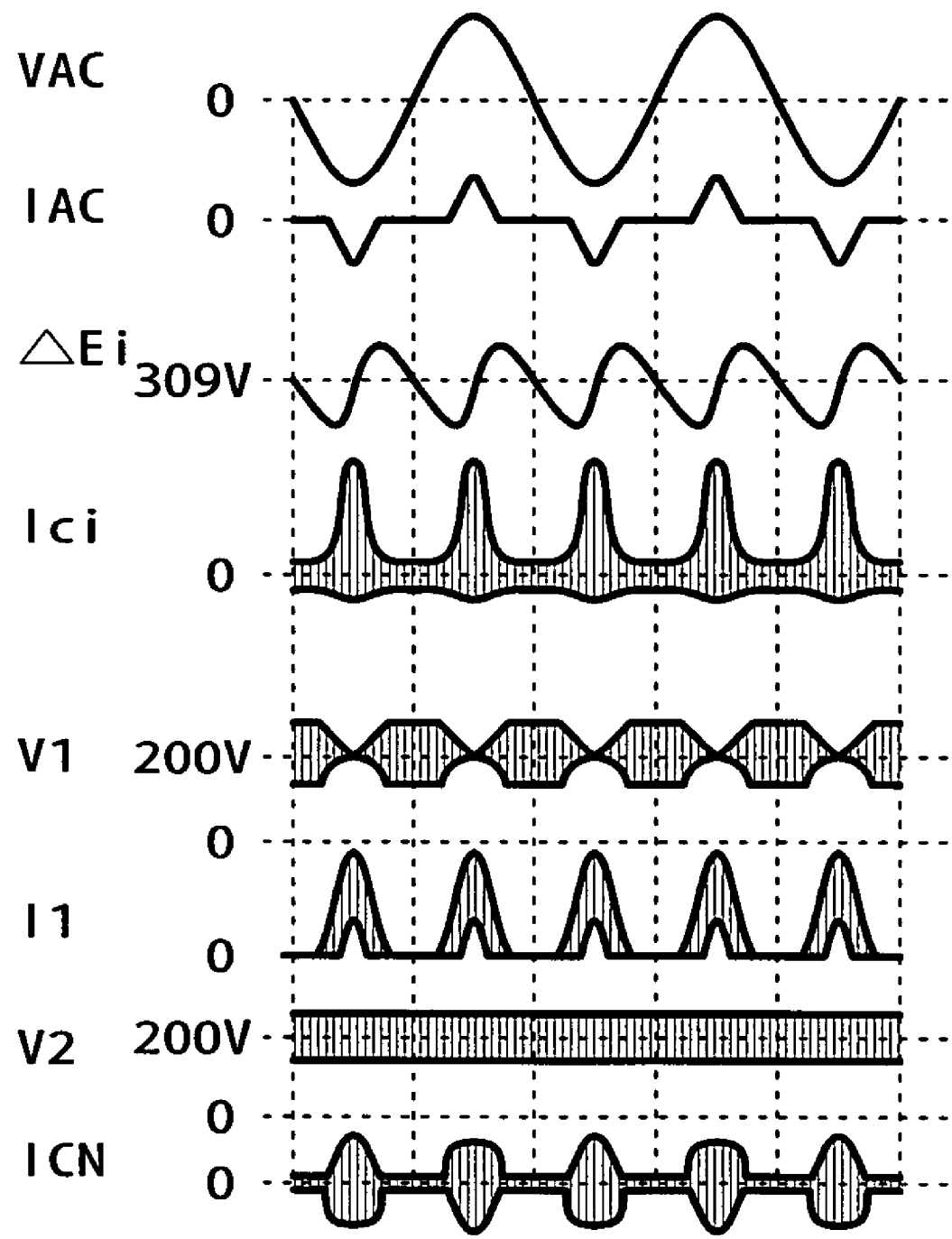
FIG. 20 is a waveform diagram illustrating operation of principal components of the power supply circuit of FIG. 18 within a period of a commercial ac power supply.

It is to be noted that, in FIG. 20, operation of several components of the circuit of FIG. 18 is illustrated within a period of the commercial ac power supply AC. Further, also in FIG. 20, a result of an experiment wherein the ac input voltage VAC was VAC=220 V and the load power Po was Po=150 W is illustrated.

If it is assumed that the ac input voltage VAC inputted also in this instance has, for example, such a waveform as seen in FIG. 20, then the ac input current IAC flows with such a waveform that it exhibits the positive and negative polarities within periods within which the ac input voltage VAC has the positive and negative polarities, respectively.

Also in this instance, alternating current I1 flows in the power factor improving circuit 5 such that it has the positive polarity within both half periods of the ac input voltage VAC as seen in FIG. 20.

An alternating voltage based on a primary side switching output excited from the primary winding N1 is obtained in the tertiary winding N3 wound on the primary side of the isolating converter transformer PIT. Consequently, the voltage V2 appearing between the end of the tertiary winding N3 adjacent the high frequency choke coil LS and the primary side ground has an alternating waveform conforming with the switching period within a period within which it exhibits positive and negative peaks as seen in FIG. 20.

The voltage V2 can be regarded as a voltage generated in the tertiary winding N3. Thus, it can be recognized from the waveform of the voltage V2 that the output voltage of the primary side switching converter in this instance is fed back to the power factor improving circuit 5 side through a magnetic coupling between the primary winding N1 and the tertiary winding N3.

This is indicated also by the fact that the alternating current I1 described above has a waveform on which high frequency components according to the switching period are superposed.

Also the charging current ICi which flows through the power factor improving circuit 5 into the smoothing capacitor Ci has a waveform which has the switching period as seen in FIG. 20 and exhibits a peak level of the positive polarity in response to a period at which the alternating current I1 exhibits a peak level of the positive polarity.

Also the full-wave rectification voltage V1 of the bridge rectification circuit Di in this instance has a waveform of the switching period and exhibits a peak level of the positive polarity corresponding to a period at which the alternating current I1 and the charging current ICi exhibit values proximate to the zero level.

Furthermore, the current ICN to flow into the filter capacitor CN has a waveform of the switching period and exhibits a peak level corresponding to the period at which the alternating current I1 and the charging current ICi exhibit values proximate to peak levels of the positive polarity.

Thus, the ac input current IAC described above flows with a waveform which exhibits a peak level corresponding to a period in which the alternating current I1, charging current Ici, and current ICN have values proximate to their peak levels.

Figure 21:
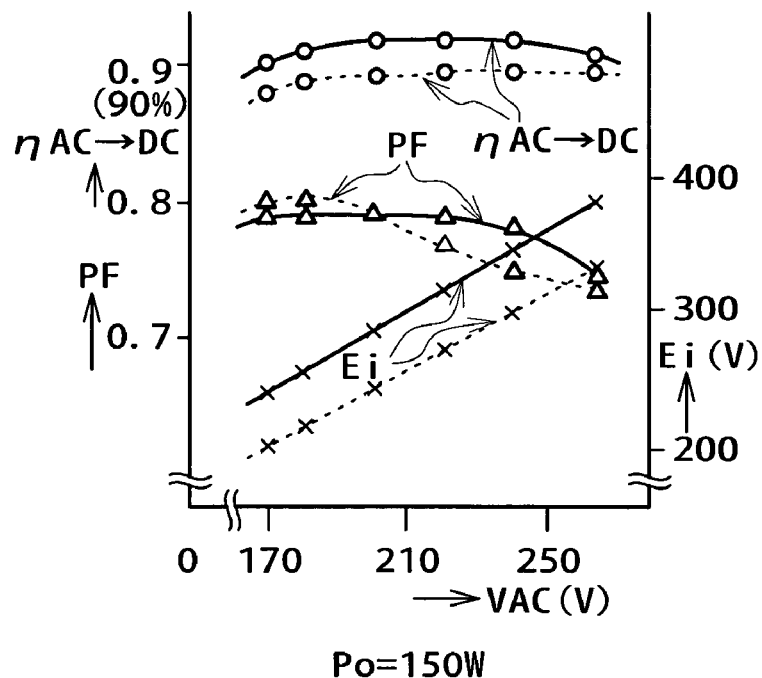
FIG. 21 is a diagram illustrating characteristics of a power factor, a power conversion efficiency, and a dc input voltage level of the power supply circuit of FIG. 18 with respect to a variation of an ac input voltage level.

It is to be noted that the ripple component ΔEi of the dc input voltage Ei which is a voltage across the smoothing capacitor Ci has a waveform which repeats increase and decrease in a period corresponding to the period of the commercial ac power supply around 309 V as seen in FIG. 21. Further, the range of variation of the ripple component ΔEi is approximately +5 V.

In the circuit shown in FIG. 18, within one of two half periods within which the ac input voltage VAC has the positive polarity, rectification current flows along a path of the [rectification diode D4→high frequency choke coil LS tertiary winding N3→smoothing capacitor Ci→rectification diode D1→filter capacitor CN].

Within the other half period within which the ac input voltage VAC has the negative polarity, rectification current flows along another path of the [rectification diode D3→high frequency choke coil LS→tertiary winding N3→smoothing capacitor Ci→rectification diode D2→filter capacitor CN].

It can be recognized from such rectification current paths as just described that, also in the circuit of FIG. 18, within a half period within which the ac input voltage VAC has the positive polarity, rectification operation is performed by the set of rectification diodes D1, D4 of the bridge rectification circuit Di. On the other hand, within another half period within which the ac input voltage VAC has the negative polarity, rectification operation is performed by the set of rectification diodes D2, D3.

Also in this instance, since a rectification diode of the high speed recovery type is used for the rectification diodes D3, D4 in the bridge rectification circuit Di as described hereinabove, a rectification diode of the high speed recovery type is inserted in each of the rectification current flow paths formed within the two different half periods of the ac input voltage VAC.

In this instance, the full-wave rectification voltage V1 of the bridge rectification circuit Di has a waveform on which an alternating voltage of the switching period excited in the tertiary winding N3 of the isolating converter transformer PIT is superposed as described hereinabove. Since such a full-wave rectification voltage V1 as just described is obtained, it can be recognized that the bridge rectification circuit Di performs switching operation of the rectification diodes in the switching period.

In other words, also in the power factor improving circuit 5, the voltage of the primary side switching output is fed back to the rectification current path and an alternating voltage based on the switching output is utilized to cause the rectification diodes of the bridge rectification circuit Di to perform switching operation.

Where the rectification diodes in the bridge rectification circuit Di perform switching operation in a period conforming with the switching period in this manner, also within a period within which the potential of the ac input voltage VAC originally is lower than the voltage across the smoothing capacitors Ci1, Ci2. Consequently, the period within which rectification current flows can be further expanded.

Where the period within which rectification current flows is expanded, also in this instance, an average waveform of an ac input current component approaches the waveform of the ac input voltage VAC, and consequently, the conduction angle of the ac input current IAC is expanded to achieve improvement of the power factor.

Also in this instance, the reason why the waveform of the ac input current IAC is smoothed in FIG. 20 is that high frequency components superposed on the rectification current component have been removed by the filter capacitor CN provided on the AC line.

Figure 22:
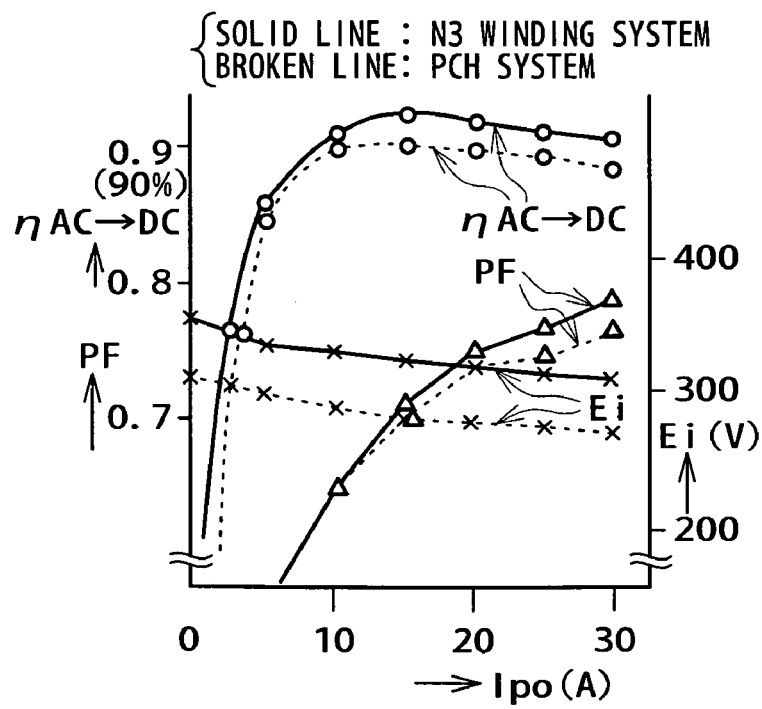
FIG. 22 is a diagram illustrating characteristics of a power factor, power conversion efficiency, and a dc input voltage level of the power supply circuit of FIG. 18 with respect to a variation of a load.

FIGS. 21 and 22 illustrate characteristics of the power supply circuit having the configuration shown in FIG. 18. Particularly, FIG. 21 illustrates characteristics of the ac to dc power conversion efficiency $\Theta AC \rightarrow DC$, power factor PF, and dc input voltage Ei within a range of variation of the ac input voltage VAC of VAC=170 to 264 V where the load power Po is fixed to Po=150 W.

Meanwhile, FIG. 22 is a characteristic diagram when the load power Po varies while the ac input voltage VAC is fixed to VAC=220 V and illustrates characteristics of the ac to dc power conversion efficiency $\Theta AC \rightarrow DC$, power factor PF, and dc input voltage Ei within a range of variation of the load current IPo of IPo=30 to 0 A.

It is to be noted that, in FIGS. 21 and 22, characteristics in the case of the circuit of FIG. 18 are indicated by solid lines and characteristics in the case of the circuit of FIG. 1 are indicated by broken lines.

It is to be noted that the results of the experiment illustrated in FIGS. 21 and 22 were obtained using the following constants of the components of the circuit shown in FIG. 18:

Isolating converter transformer PIT: ferrite core of EER-40, gap length Gap=1.5 mm Primary winding N1=80 T (turns)
Secondary winding N2 (N2A+N2B): 2 T+2 T across dividing position at center tap
Tertiary winding N3=15 T
High frequency choke coil LS: ferrite core of EE-20, gap length Gap=1.0 mm, inductance value=115 µH.

First, it can be recognized from the characteristic diagram of FIG. 21 that the dc input voltage Ei of the circuit of the example of FIG. 18 exhibits a higher level than that of the circuit of FIG. 1 over a range of the ac input voltage VAC=170 to 264 V.

This indicates that, also in the circuit of FIG. 18, since the power choke coil PCH can be omitted, the drop of the dc input voltage Ei is prevented.

Where the drop of the dc input voltage Ei is prevented in this manner, the necessity to increase the primary side series resonance current I0 is eliminated, and it is possible to reduce the switching loss and improve the power conversion efficiency as much.

Incidentally, the ac to dc power conversion efficiency $\eta AC \rightarrow DC$ of the circuit shown in FIG. 18 is $\eta AC \rightarrow DC$=approximately 91.4% as seen in FIGS. 21 and 22 where the ac input voltage VAC and the load power Po are VAC=220 V and Po=150 W (E0×IPo=5 V×30 A), respectively. Thus, improvement by approximately 2.1% is achieved when compared with $\eta AC \rightarrow DC$=89.3% in the case of the circuit of FIG. 1 under the same conditions.

Further, from FIGS. 21 and 22, a power factor PF of PF=approximately 0.795 is obtained as the power factor PF in the case of the circuit of FIG. 18 where the ac input voltage VAC and the load power Po are VAC=220 V and Po=150 W, respectively.

Furthermore, the high frequency choke coil LS in the circuit shown in FIG. 18 can be set so as to have a comparatively low inductance value of approximately 115 µH as indicated hereinabove. From this, the choke coil provided for improving the power factor can be formed in reduced size and weight when compared with the power choke coil PCH (41.5 mH) provided in the circuit of FIG. 1.

More particularly, while the weight of the power choke coil PCH of the circuit of FIG. 1 is approximately 155 g, the weight of the high frequency choke coil LS provided in the circuit of FIG. 18 is approximately 15 g and can be reduced to approximately ⅒.

In this manner, also the circuit of FIG. 18 can be formed with a circuit area and a circuit weight reduced from those in the circuit of FIG. 1.

From the foregoing, also with the configuration of the switching power supply circuit of the third embodiment, improvement of the power conversion efficiency and the power factor and reduction in size and weight of the choke coil can be anticipated when compared with the circuit of FIG. 1.

<Fourth Embodiment>

Figure 23:
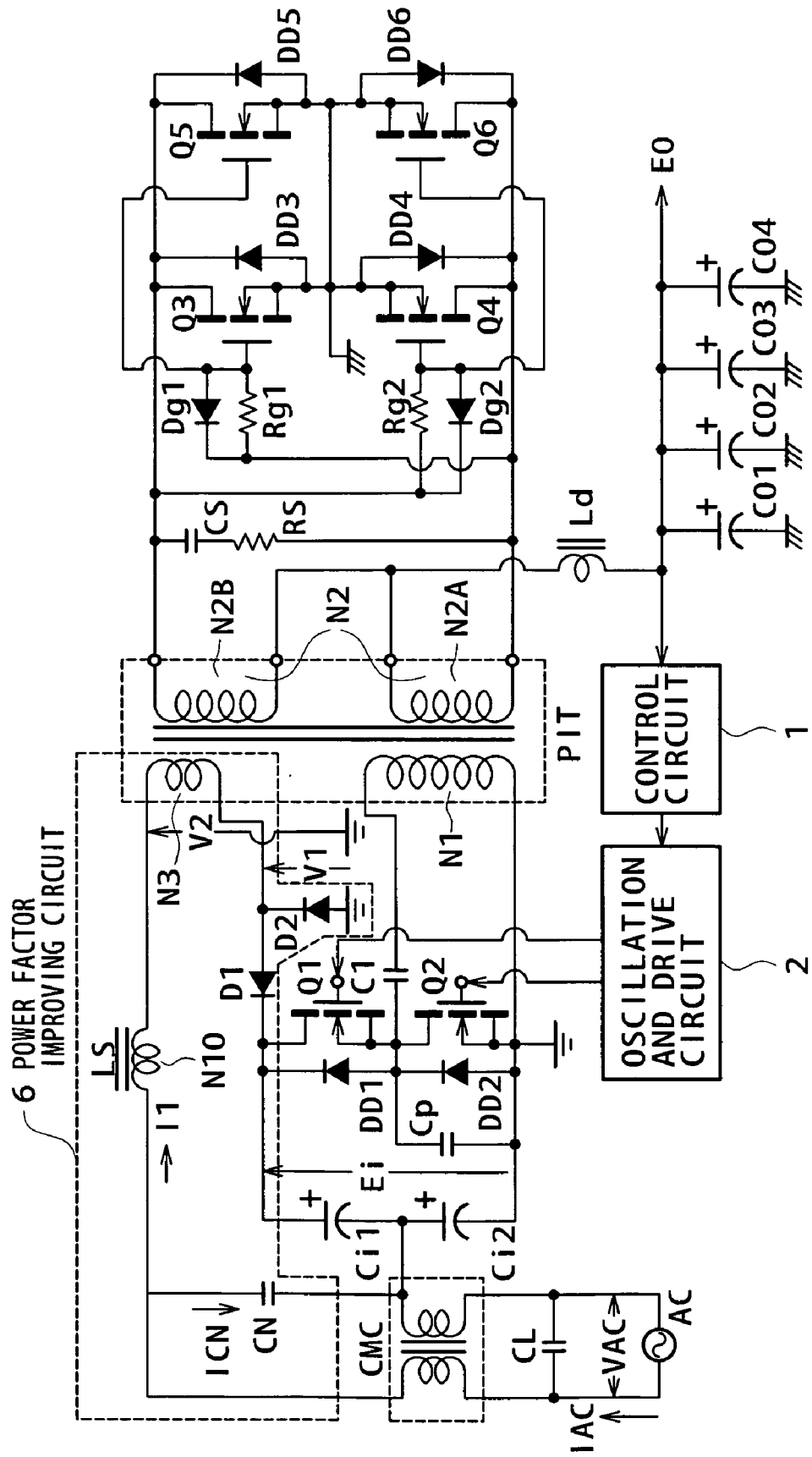
FIG. 23 is a circuit diagram showing an example of a configuration of a switching power supply circuit according to a fourth embodiment of the present invention.

A configuration of a switching power supply circuit according to a fourth embodiment of the present invention is shown in FIG. 23.

The switching power supply circuit of the fourth embodiment has the basic configuration ready for an ac 100 V system similarly to the second embodiment described hereinabove with reference to FIG. 14. The switching power supply circuit replaces only the configuration of a power factor improving circuit with a power factor improving circuit which uses a tertiary winding N3 and a high frequency choke coil LS similar to those of the third embodiment.

Accordingly, the following description is given principally of the configuration of the power factor improving circuit 6 provided in the power supply circuit of the fourth embodiment.

Referring to FIG. 23, the power factor improving circuit 6 includes a series connection circuit of a high frequency choke coil LS and a tertiary winding N3 inserted in series in a positive electrode line of a commercial ac power supply AC as seen in FIG. 23. Meanwhile, a negative electrode line of the commercial ac power supply AC is connected to a node between a pair of smoothing capacitors Ci1, Ci2.

It is to be noted that, also in this instance, a filter capacitor CN is inserted in parallel between the lines of the commercial ac power supply AC.

Further, in this instance, the anode of a rectification diode D1 is connected to an end of the tertiary winding N3 remote from the high frequency choke coil LS. A rectification diode D2 is inserted in series between the node between the tertiary winding N3 and the rectification diode D1 and the primary side ground. The rectification diode D2 is grounded at the anode thereof to the primary side ground and connected at the cathode thereof to the node between the tertiary winding N3 and the rectification diode D1.

Further, the cathode of the rectification diode D1 is connected to the positive electrode terminal of the smoothing capacitor Ci1 through the drain of a switching element Q1.

Also in this instance, a rectification diode of the high speed recovery type is selectively used for the rectification diodes D1, D2.

Operation of the circuit of FIG. 23 which includes the power factor improving circuit 6 having the configuration described above is described below with reference to a waveform diagram of FIG. 24.

Figure 24:
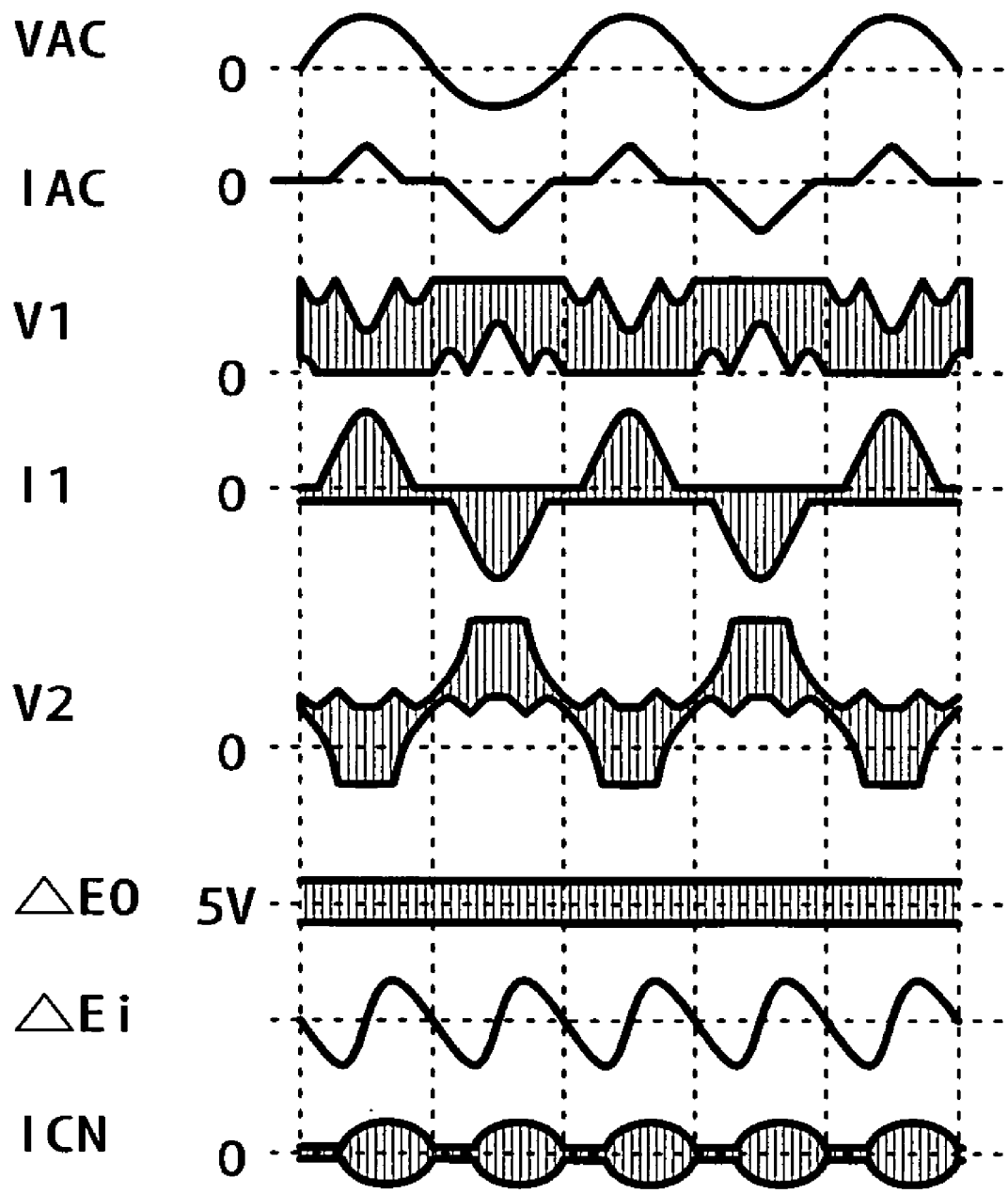
FIG. 24 is a waveform diagram illustrating operation of principal components of the power supply circuit of FIG. 23 within a period of a commercial ac power supply.

It is to be noted that, also in FIG. 24, operation of several components of the circuit of FIG. 23 is illustrated within a period of the commercial ac power supply AC. Further, also in FIG. 23, a result of an experiment wherein the ac input voltage VAC was VAC=100 V and the load power Po was Po=150 W is illustrated.

The ac input voltage VAC also in this instance has, for example, such a waveform corresponding to the AC 100 V system as seen in FIG. 24. Further, the ac input current IAC flows with such a waveform that it exhibits the positive and negative polarities within periods within which the ac input voltage VAC has the positive and negative polarities, respectively.

The voltage V2 appearing between the end of the tertiary winding N3 wound on the isolating converter transformer PIT adjacent the high frequency choke coil LS and the primary side ground has a waveform conforming with the switching period. From this, it can be recognized that an alternating voltage based on the primary side switching output excited in the tertiary winding N3 from the primary winding N1 of the isolating converter transformer PIT is fed back to the power factor improving circuit 6 side.

Where the voltage V2 having such a waveform as described above is obtained, the alternating current I1 flowing through the high frequency choke coil LS in the power factor improving circuit 6 has a waveform on which high frequency components of the switching period are superposed.

It is to be noted that the alternating current I1 has a waveform which exhibits the positive and negative polarities within periods within which the ac input voltage VAC exhibits the positive and negative polarity similarly to that of the alternating current I1 shown in FIG. 15 in the case of the circuit of FIG. 14.

Further, the voltage V1 which is a voltage across the rectification diode D2 shown in FIG. 23 has a waveform of the switching period as seen in FIG. 24, and has a low frequency component corresponding to the period of the commercial ac power supply. The Low frequency component has a waveform which exhibits a peak level of the positive polarity within a half period within which the ac input voltage VAC has the negative polarity but exhibits reversal to the zero level side within the other half period within which the ac input voltage VAC has the positive polarity.

Also the current ICN flowing into the filter capacitor CN has a waveform of the switching period which exhibits a peak level corresponding to a period within which the alternating current I1 described above exhibits a peak level.

It is to be noted that also the ripple component ΔEi of the dc input voltage Ei in this instance has such a waveform as seen in FIG. 24 and varies within a range of approximately ±5 V. Meanwhile, the ripple component ΔE0 of the secondary side dc output voltage E0 has such a waveform of the switching period as seen in FIG. 24 and varies within a range of approximately ±0.5 V.

In the circuit shown in FIG. 23, within one of two half periods within which the ac input voltage VAC has the positive polarity, rectification current flows along a path of the [high frequency choke coil LS→tertiary winding N3→rectification diode D1→smoothing capacitor Ci1→filter capacitor CN]. Within the other half period within which the ac input voltage VAC has the negative polarity, rectification current flows along another path of the [smoothing capacitor Ci2→rectification diode D2→tertiary winding N3→high frequency choke coil LS→filter capacitor CN].

Accordingly, also in the circuit shown in FIG. 23, within a half period within which the ac input voltage VAC has the positive polarity, rectification operation is performed by the rectification diode D1 whereas, within another half period within which the ac input voltage VAC has the negative polarity, rectification operation is performed by the rectification diode D2 similarly as in the circuit shown in FIG. 14. Also in this instance, since a rectification diode of the high speed recovery type is used for the rectification circuits D1, D2, the rectification diodes perform switching operation of the switching period based on an alternating voltage excited in the tertiary winding N3.

Where the rectification diodes perform switching operation within the switching period in this manner, also within a period within which the level of the ac input voltage VAC originally is lower than the voltage across the smoothing capacitors Ci1, Ci2, the diodes of the high speed recovery type are rendered conducting in response to the superposed waveform of the switching period. Consequently, also within the period mentioned, charging current can be supplied to the smoothing capacitor Ci.

In short, also in this instance, the conduction angle of the ac input current IAC is expanded thereby to achieve improvement of the power factor.

Figure 25:
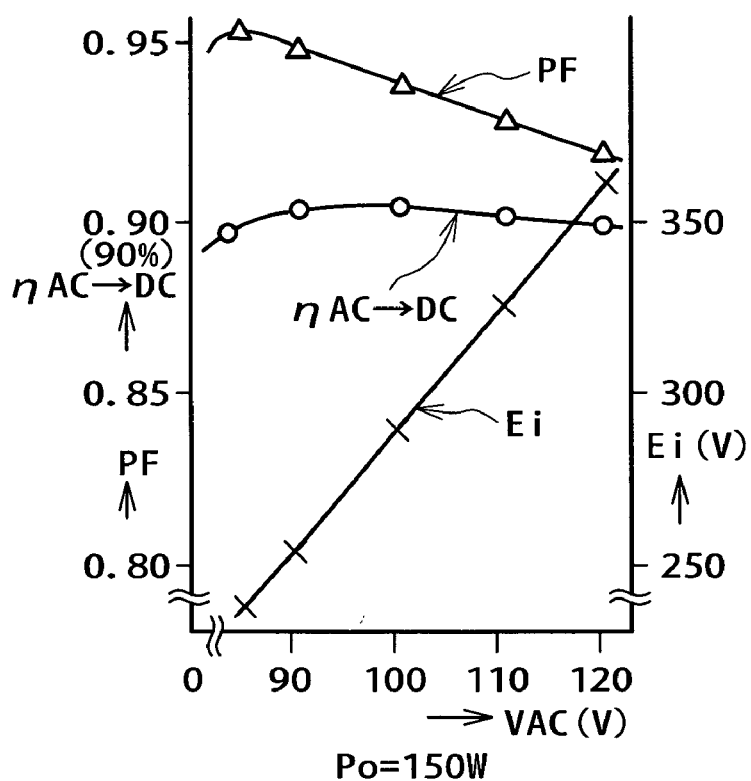
FIG. 25 is a diagram illustrating characteristics of a power factor, a power conversion efficiency, and a dc input voltage level of the power supply circuit of FIG. 23 with respect to a variation of an ac input voltage level.
Figure 26:
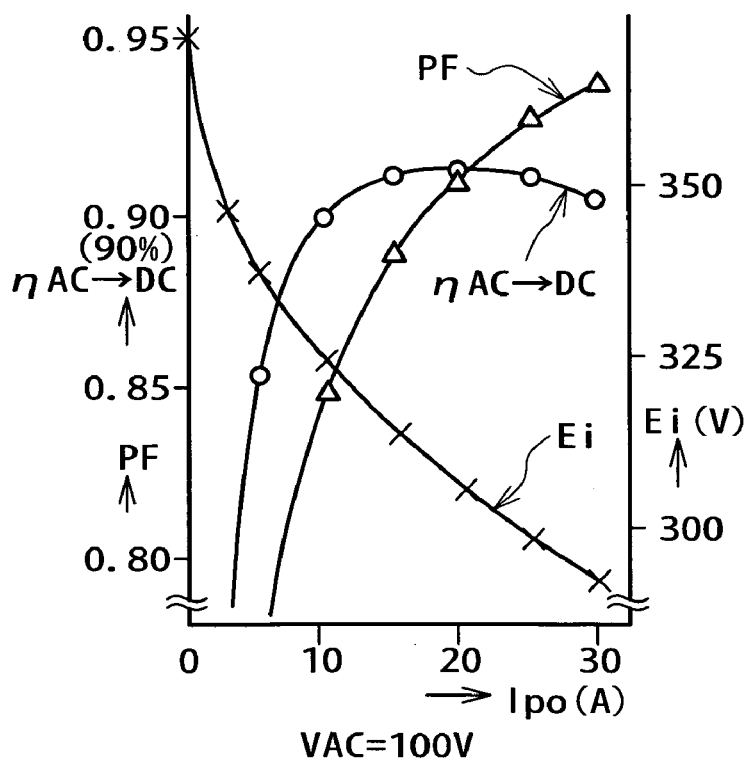
FIG. 26 is a diagram illustrating characteristics of a power factor, power conversion efficiency, and a dc input voltage level of the power supply circuit of FIG. 23 with respect to a variation of a load.

FIGS. 25 and 26 illustrate characteristics of the power supply circuit shown in FIG. 23.

Particularly, FIG. 25 illustrates characteristics of the ac to dc power conversion efficiency ηAC→DC, power factor PF and dc input voltage Ei within a range of variation of the ac input voltage VAC of VAC=85 to 120 V where the load power Po is fixed to Po=150 W. Meanwhile, FIG. 26 is a characteristic diagram when the load power Po varies while the ac input voltage VAC is fixed to VAC=100 V and illustrates characteristics of the ac to dc power conversion efficiency ηAC→DC, power factor PF and dc input voltage Ei within a range of variation of the load current IPo of IPo=30 to 0 A.

It is to be noted that, also in this instance, the results of the experiment illustrated in FIGS. 25 and 26 were obtained using the following constants of the components of the circuit shown in FIG. 23:

Isolating converter transformer PIT: ferrite core of EER-40, gap length Gap=1.5 mm Primary winding N1=75 T (turns)

Secondary winding N2 (N2A+N2B): 2 T+2 T across dividing position at center tap

Tertiary winding N3=15 T

High frequency choke coil LS: ferrite core of EE-22, gap length Gap=1.0 mm, inductance value=63 μH.

First, it can be recognized from the characteristic diagram of FIG. 25 that the dc input voltage Ei also of the circuit shown in FIG. 23 exhibits a high level over a range of the ac input voltage VAC=85 to 120 V when compared with the characteristics of the circuit of FIG. 6 described hereinabove with reference to FIG. 7. In short, also in the fourth embodiment, since the power choke coil PCH can be omitted, the drop of the dc input voltage Ei is prevented.

Where the drop of the dc input voltage Ei is prevented in this manner, also in this instance, the necessity to reduce the number of turns of the primary winding N1 of the isolating converter transformer PIT to increase the primary side series resonance current I0 is eliminated, and it is possible to improve the power conversion efficiency as much.

Thus, the ac to dc power conversion efficiency ηAC→DC obtained by the circuit shown in FIG. 23 is ηAC→DC=approximately 90.4% as seen in FIGS. 25 and 26 where the ac input voltage VAC and the load power Po are VAC=100 V and Po=150 W (E0×IPo=5 V×30 A), respectively. Thus, improvement of approximately 1.2% can be achieved when compared with ηAC→DC=89.2% in the case of the circuit of FIG. 6 under the same conditions.

Further, as seen in FIGS. 25 and 26, according to the circuit shown in FIG. 23, the power factor PF of approximately 0.940 is obtained where the ac input voltage VAC and the load power Po are VAC=100 V and Po=150, respectively. In short, a result that the power factor PF exhibits improvement from PF=0.77 which is obtained with the circuit of FIG. 6 is obtained.

Further, also in the circuit shown in FIG. 23, the high frequency choke coil LS is formed such that it has a comparatively low inductance of, for example, 63 μH mentioned hereinabove. Therefore, the high frequency choke coil LS can be formed in a reduced size and weight when compared with the power choke coil PCH (7.2 mH) similarly.

For example, the weight of the high frequency choke coil LS in the case of the circuit of FIG. 23 is approximately 15 g. Consequently, also in this instance, the weight of the high frequency choke coil LS can be reduced to approximately $\frac{1}{10}$ when compared with 155 g of the power choke coil PCH provided in the circuit of FIG. 6.

In this manner, also the power supply circuit of the fourth embodiment can achieve improvement of the power conversion efficiency and the power factor and reduction in size and weight of the choke coil when compared with an alternative configuration which includes the power choke coil PCH as a configuration for improvement of the power factor.

<Other Examples of the Secondary Side Configuration>

Incidentally, while the foregoing description relates to examples wherein a synchronous rectification circuit is formed on the secondary side of a power supply circuit, according to an embodiment wherein expansion of the continuous mode is achieved by setting of the magnetic flux density of the isolating converter transformer PIT, also where the rectification circuit of the secondary side is formed from diode elements as seen in FIG. 30, reduction of the power loss can be achieved effectively.

As described hereinabove, when the conventional switching power supply circuit is in a heavy load condition, the secondary side rectification current exhibits the discontinuous mode, and the rectification diodes on the secondary side exhibit a high level of continuity loss. This obstructs achievement of improvement of the power conversion efficiency.

In contrast, according to the present embodiment, since the continuous mode is maintained also in a heavy load condition, the continuity period of the secondary side rectification current is expanded to the length same as the period within which the primary side series resonance current I0 flows. The peak level of the secondary side rectification current can be lowered as much.

Where the peak level of the secondary side rectification current is lowered in this manner, the continuity loss by the rectification elements on the secondary side can be reduced thereby to effectively reduce the power loss.

In the following, an example of a configuration where the rectification elements on the secondary side are formed from a diode element in this manner is described.

It is to be noted that, although such a configuration wherein a full-wave rectification circuit is formed as shown in FIG. 30 is not illustrated and not described, naturally it is possible to adopt such a configuration of a full-wave rectification circuit as just described.

Further, while those figures of the accompanying drawings which are referred to in the following description show only the configuration of the secondary side, the configuration of the primary side may be any of the configurations of the embodiments described hereinabove with reference to FIGS. 9, 14, 18 and 23.

Figure 27:
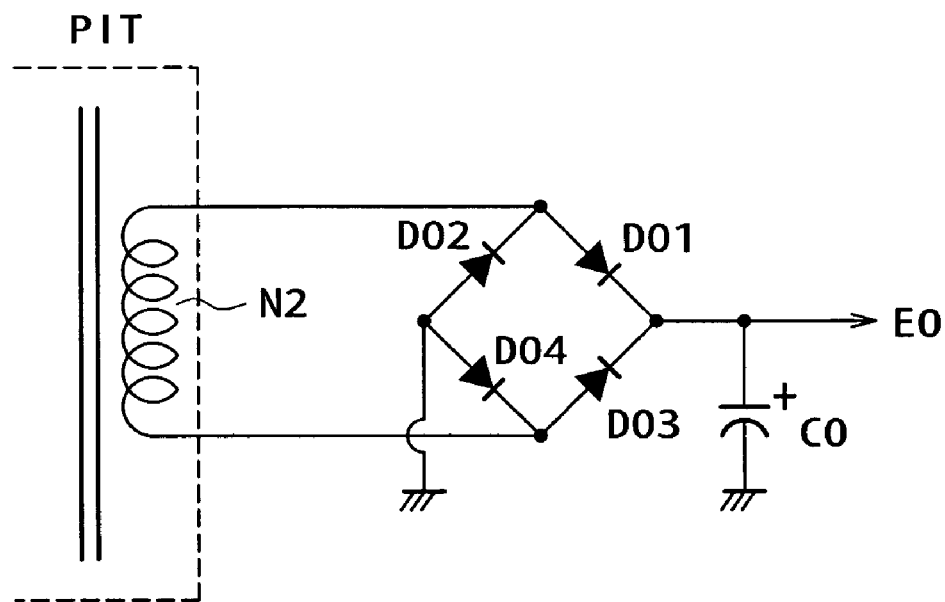
FIGS. 27, 28, and 29 are circuit diagrams illustrating different examples of a configuration of the secondary side of the power supply circuits according to the present invention.

Referring first to FIG. 27, there is shown an example wherein a bridge rectification circuit is formed.

In this instance, the center tap of the secondary winding N2 is omitted as seen in FIG. 27. For the secondary winding N2, a bridge rectification circuit formed from (secondary side) rectification diodes D01 to D04 and a full-wave rectification smoothing circuit formed from a smoothing capacitor C0 are provided.

The full-wave rectification smoothing circuit operates such that, within one of half periods of an alternating voltage excited in the secondary winding N2, the set of rectification diodes D01 and D04 of the bridge rectification circuit are rendered conducting to charge the smoothing capacitor C0 with the rectification current. Within the other half period of the alternating voltage excited in the secondary winding N2, the set of rectification diodes D02, D03 are rendered conducting to charge the smoothing capacitor C0 with the rectification current.

Consequently, a secondary side dc output voltage E0 of a level equal to the level of the alternating voltage excited in the secondary winding N2 is obtained across the smoothing capacitor C0.

It is to be noted that, though not shown, the secondary side dc output voltage E0 also in this instance is branched and inputted as a detection voltage for the control circuit 1. This similarly applies also to the examples described below.

Figure 28:
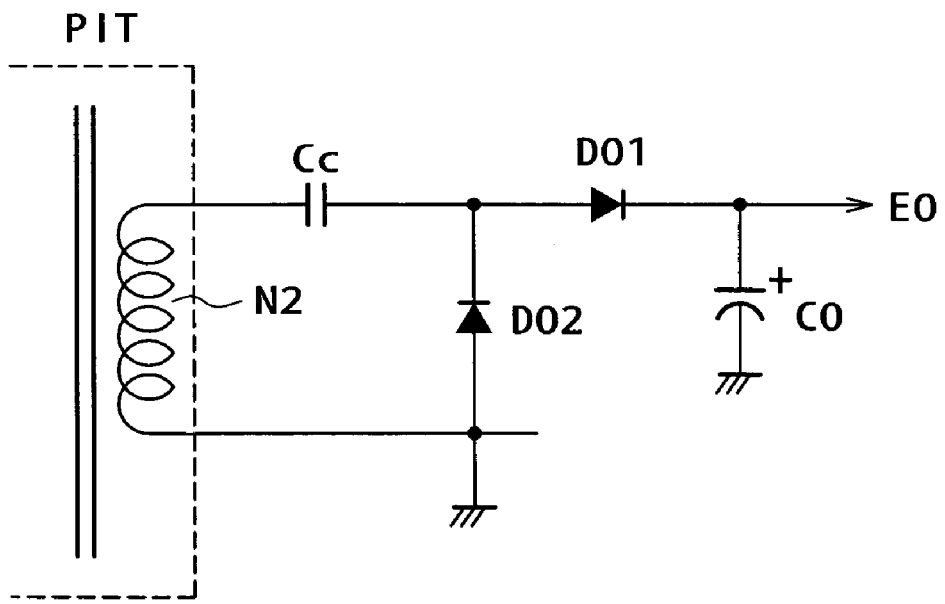

Another example shown in FIG. 28 includes a configuration of a voltage doubler half-wave rectification circuit.

Also in the circuit of FIG. 28, the center tap of the secondary winding N2 is omitted. It is to be noted, however, that, in this instance, the anode of the rectification diode D01 is connected to a first end of the secondary winding N2 through a series connection of a capacitor Cc as seen in FIG. 28. The cathode of the rectification diode D01 is connected to the positive electrode terminal of the smoothing capacitor C0.

The negative electrode terminal of the smoothing capacitor C0 is connected to the secondary side ground. Also the other second end of the secondary winding N2 is connected to the secondary side ground.

Furthermore, the rectification diode D02 is inserted such that it is connected at the anode thereof to a node between the second end of the secondary winding N2 and the secondary side ground and at the cathode thereof to the anode of the rectification diode D01 so that it is connected in parallel to the secondary winding N2.

According to the connection scheme described above, within one of half periods of an alternating voltage excited in the secondary winding N2, the rectification diode D02 connected in parallel to the secondary winding N2 is rendered conducting, and consequently, the rectification current flows through the rectification diode D02 and the capacitor Cc. In other words, within the period, the rectification current on the secondary side is charged into the capacitor Cc, and consequently, a voltage of a level equal to the alternating voltage level excited in the secondary winding N2 is generated across the capacitor Cc.

On the other hand, within the other half period of the alternating voltage excited in the secondary winding N2, the rectification diode D01 is rendered conducting and the rectification current flows through the rectification diode D01 and the smoothing capacitor C0 to charge the smoothing capacitor C0. In short, within the period, the rectification diode D01 performs rectification operation for the alternating voltage on which the voltage obtained across the capacitor Cc in such a manner as described above is superposed. Consequently, a secondary dc output voltage E0 of a level equal to twice the alternating voltage level excited in the secondary winding N2 is generated across the smoothing capacitor C0.

Thus, according to the configuration shown in FIG. 28, voltage doubler half-wave rectification operation is obtained wherein the smoothing capacitor C0 is charged only within one of half periods of the alternating voltage excited in the secondary winding N2 whereas a level corresponding to twice the alternating voltage level is obtained as the voltage across the smoothing capacitor C0 (secondary side dc output voltage E0).

Figure 29:
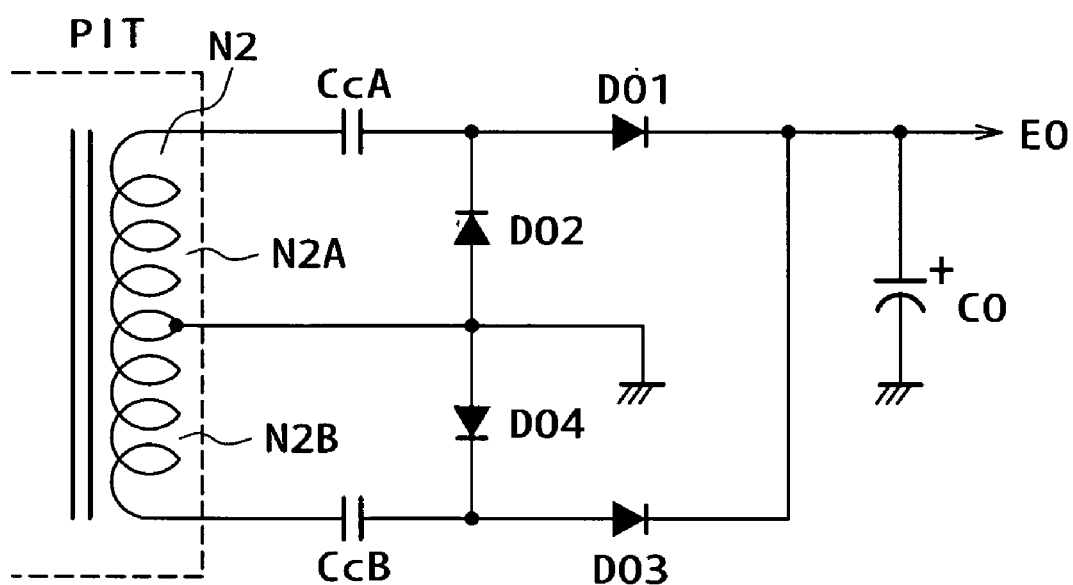

FIG. 29 shows an example wherein a voltage doubler full-wave rectification circuit is formed.

In the circuit shown in FIG. 29, the secondary winding N2 is center tapped to form two windings including a secondary winding N2A and another secondary winding N2B as seen in FIG. 29. The center tap output of the secondary winding N2 is connected to the secondary side ground.

A rectification diode D01 is connected at the anode thereof to an end of the secondary winding N2A remote from the center tap through a series connection of a capacitor CcA shown in FIG. 29. The rectification diode D01 is connected at the cathode thereof to the positive electrode terminal of a smoothing capacitor C0.

Further, another rectification diode D02 is connected at the anode thereof to a node between the center tap of the secondary winding N2 and the secondary side ground and at the cathode thereof to the node between the anode of the rectification diode D01 and the capacitor CcA. Consequently, the rectification diode D02 is connected in parallel to the secondary winding N2A.

According to such a connection scheme as just described, the secondary winding N2A, rectification diodes D01, D02 and capacitor CcA have a configuration similar to that of the voltage doubler half-wave rectification circuit formed from the secondary winding N2, rectification diodes D01, D02 and capacitor Cc as described hereinabove with reference to FIG. 28.

The rectification circuit formed from the secondary winding N2A, rectification diodes D01, D02 and capacitor CcA is hereinafter referred to as first voltage doubler half-wave rectification circuit.

Meanwhile, a rectification diode D03, another rectification diode D04 and a capacitor CcB are connected to the secondary winding N2B in a symmetrical relationship to the first voltage doubler half-wave rectification circuit formed on the secondary winding N2A side to form a second voltage doubler half-wave rectification circuit.

According to the configuration described above, the rectification diode D02 and the rectification diode D04 are connected in parallel to the secondary winding N2A and the secondary winding N2B, respectively. Consequently, within one of half periods of an alternating voltage obtained at the secondary winding N2, the rectification diode D02 of the first voltage doubler half-wave rectification circuit side is rendered conducting to charge the capacitor CcA with the rectification current. In other words, within the period, a voltage of the level equal to the alternating voltage obtained at the secondary winding N2A is generated across the capacitor CcA.

On the other hand, within the other half period of the alternating voltage, the rectification diode D04 of the second voltage doubler half-wave rectification circuit side is rendered conducting to charge the capacitor CcB with the rectification current. Accordingly, within the period, a voltage of the level equal to the alternating voltage obtained at the secondary winding N2B is generated across the capacitor CcB.

Where the entire configuration of the rectification smoothing circuit formed for the secondary winding N2 is considered, within one of half periods of the alternating voltage wherein the first voltage doubler half-wave rectification circuit charges the capacitor CcA as described above, the rectification current is branched and flows along a path of the [secondary winding N2B→capacitor CcB→rectification diode D03→smoothing capacitor C0→rectification diode D02].

Within this period, a voltage of the alternating voltage level is obtained across the capacitor CcB on the second voltage doubler half-wave rectification circuit side as can be recognized from the foregoing description. From this, the rectification diode D03 inserted in the rectification current path on the second voltage doubler half-wave rectification circuit side performs rectification operation for the alternating voltage on which the voltage obtained across the capacitor CcB in this manner is superposed.

Further, within the period, the alternating voltage appearing across the secondary winding N2A is canceled from the polarity of the voltage across the capacitor CcA on the first voltage doubler half-wave rectification circuit side, and the rectification diode D03 performs rectification operation for the voltage across the series connection of the secondary winding N2B and the capacitor CcB.

In other words, a voltage of a level corresponding to twice the alternating voltage level generated in the secondary winding N2B is generated across the smoothing capacitor C0 within the period in response to such rectification operation of the rectification diode D03.

On the other hand, also within the other half period of the alternating voltage wherein the capacitor CcB is charged, the rectification current is branched and flows along another path of the [secondary winding N2A→capacitor CcA→rectification diode D01→smoothing capacitor C0→rectification diode D04].

Also within this period, since a voltage of the alternating voltage level is obtained across the capacitor CcA, the rectification diode D01 inserted in the rectification current path performs rectification operation for the alternating voltage on which the voltage obtained across the capacitor CcA in this manner is superposed. Further, also within the period, the alternating voltage appearing across the secondary winding N2B is canceled from the polarity of the voltage across the capacitor CcB on the second voltage doubler half-wave rectification circuit side, and the rectification diode D01 performs rectification operation for the voltage across the series connection of the secondary winding N2A and the capacitor CcA.

Therefore, also within the period, a voltage of a level corresponding to twice the alternating voltage level generated in the secondary winding N2A is generated across the smoothing capacitor C0.

In this manner, according to the circuit configuration of FIG. 29, operation of a voltage doubler full-wave rectification smoothing circuit is obtained wherein it charges rectification current into the smoothing capacitor C0 within each of half periods of the alternating voltage generated in the secondary winding N2 to produce a voltage of a level corresponding to twice the alternating voltage level obtained by each secondary winding (N2A, N2B).

It is to be noted that a bridge rectification circuit can be used for the rectification diodes D01 to D04 according to the connection scheme shown in FIG. 29.

The present invention is not limited to the configurations of the power supply circuits described hereinabove.

For example, the configuration of details of the synchronous rectification circuit of the winding voltage detection system on the secondary side may be modified suitably. Further, for example, for the switching elements of the primary side switching converter, any other element than a MOS-FET such as an IGBT (Insulated Gate Bipolar Transistor) may be adopted only if it can be used as an element of the separately excited type. Further, various parameters such as constants of the parts or elements described hereinabove may be altered in accordance with actual conditions and so forth.

Further, according to the present invention, a switching power supply circuit may include a current resonance converter of the self-excited type. In this instance, for example, a bipolar transistor can be selectively used for the switching elements. Further, the present invention can be applied also to a current resonance converter formed from four switching elements connected in a full bridge connection.

Also the configuration of the power factor improving circuits 3 to 6 is not limited to those described hereinabove in connection with the embodiments, but various circuit configurations according to the voltage feedback system proposed by the assignee of the invention of the present application can be adopted.

Furthermore, various configurations are possible wherein a diode element is used for the rectification elements on the secondary side, and the present invention is not limited to the configurations described hereinabove.

What is claimed is:

1. A switching power supply circuit, comprising:
a rectification smoothing section for receiving an ac voltage as an input to produce a rectified smoothed voltage;
a switching section including a switching element for receiving the rectified smoothed voltage as a dc input voltage to perform a switching operation thereon;
a switching drive section for driving said switching element at a predetermined switching frequency to perform the switching operation;
an insulating converter transformer including a primary winding wound thereon for receiving a switching output obtained by the switching operation of said switching section and a secondary winding wound thereon for exciting an alternating voltage using a switching output obtained from said primary winding;
a primary side series resonance circuit formed from a leakage inductance component of said primary winding of said insulating converter transformer and a capacitance of a primary side series resonance capacitor connected in series to said primary winding for causing said switching section to perform an operation of the current resonance type;
a secondary side smoothing capacitor;
a dc output voltage generation section for rectifying the alternating voltage obtained by said secondary winding of said insulating converter transformer and charging said secondary side smoothing capacitor with resulting rectification current to obtain a secondary side dc output voltage as a voltage across said secondary side smoothing capacitor;
a constant voltage control section for variably controlling said switching frequency of said switching drive section in response to the level of the secondary side dc output voltage to perform constant voltage control of the secondary side dc output voltage; and
a power factor improving circuit for feeding back the alternating voltage based on the switching output of said switching section to a rectification current path formed in said rectification smoothing section and utilizing the alternating voltage based on the switching output to selectively interrupt the rectified current component by a rectifying element provided in said rectification smoothing section thereby improving a power factor;
said insulating converter transformer being formed so as to have a magnetic flux density set at a predetermined level with which secondary side rectification current flowing in said dc output voltage generation section has a continuous mode irrespective of a load condition connected to the secondary side dc output voltage and a variation of said ac voltage.

2. The switching power supply circuit according to claim 1, wherein a length of a gap formed in said insulating converter transformer is set at a length to cause the magnetic flux density of said insulating converter transformer to be at the predetermined level.

3. The switching power supply circuit according to claim 1, wherein a number of turns of said primary winding and said secondary winding is respectively set thereby to set the magnetic flux density of said insulating converter transformer to be at the predetermined level.

4. The switching power supply circuit according to claim 1, wherein said power factor improving circuit includes a voltage feedback transformer including a primary winding to which the switching output of said switching section is inputted and a secondary winding in which an alternating voltage corresponding to a switching output obtained by said primary winding of a voltage feedback transformer is excited, and said rectifying element provided in said rectification smoothing section uses the alternating voltage excited in said secondary winding of said voltage feedback transformer to interrupt the rectified current component to improve the power factor.

5. The switching power supply circuit according to claim 1, wherein said power factor improving circuit includes a tertiary winding wound on the primary side of said insulating converter transformer, and said diode element provided in said rectification smoothing section uses the alternating voltage excited in said tertiary winding through said primary winding of said insulating converter transformer and corresponding to the switching output of said switching section to interrupt the rectified current component to improve the power factor.

6. The switching power supply circuit according to claim 1, wherein said dc output voltage generation section includes a synchronous rectification circuit of a wiring voltage detection system formed therein and connects a center tap output of said secondary winding of said insulating converter transformer to a secondary side ground through a series connection of said secondary side smoothing capacitor, said synchronous rectification circuit including:
a first field effect transistor connected in series between a first end of said secondary winding remote from the center tap output and the secondary side ground;
a second field effect transistor connected in series between a second end of said secondary winding remote from the center tap and the secondary side ground;
a first drive circuit including a resistance element for detecting a secondary winding voltage within a period of one half wave within which rectified current is to be supplied from said first field effect transistor and outputting a gate voltage to control said field effect transistor to an on state; and
a second drive circuit including a resistance element for detecting a secondary, winding voltage within a period of the other half wave within which rectified current is to be supplied from said second field effect transistor and outputting a gate voltage to control said second field effect transistor to an on state.

7. The switching power supply circuit according to claim 1, wherein said dc output voltage generation section charges said secondary side smoothing capacitor with the rectification current within a period of each half wave of the alternating voltage obtained by said secondary winding of said insulating converter transformer.

8. The switching power supply circuit according to claim 1, wherein said dc output voltage generation section includes a voltage doubler rectification circuit formed therein for generating the secondary side dc output voltage that has a level equal to twice the level of a alternating voltage obtained by said secondary winding of said insulating converter transformer.

9. The switching power supply circuit according to claim 1, wherein said dc output voltage generation section includes a voltage doubler half-wave rectification circuit for charging said secondary side smoothing capacitor with the rectification current within a period of only one of two half waves of the alternating voltage obtained by said secondary winding of said insulating converter transformer and generating the secondary side dc output voltage that has a level equal to twice a level of the alternating voltage obtained by said secondary winding.

10. The switching power supply circuit according to claim 1, wherein said dc output voltage generation includes a voltage doubler full-wave rectification circuit for charging said secondary side smoothing capacitor with the rectification current within a period of each of half wave of the alternating voltage obtained by said secondary winding of said insulating converter transformer and generating the secondary side dc output voltage equal to twice a level of the alternating voltage obtained by said secondary winding.

11. The switching power supply circuit according to claim 1, further comprising a primary side partial voltage resonance circuit formed from a capacitance of a partial voltage resonance capacitor connected in parallel to said switching element of said switching section and a leakage inductance component of said primary winding of said insulating converter transformer for performing voltage resonance operation in response to timings at which said switching element turns on and off.

* * * * *

UNITED STATES PATENT AND TRADEMARK OFFICE
CERTIFICATE OF CORRECTION

PATENT NO. : 7,054,167 B2 Page 1 of 1
APPLICATION NO. : 10/982246
DATED : May 30, 2006
INVENTOR(S) : Masayuki Yasumura It is certified that error appears in the above-identified patent and that said Letters Patent is hereby corrected as shown below:

Column 18, line 21, "Θ" should read --η--.
Column 23, line 7, "Θ" should read --η--.
Column 23, line 14, "Θ" should read --η--.
Column 23, line 57, "Θ" should read --η--.
Column 31, line 47, "Θ" should read --η--.
Column 31, line 54, "Θ" should read --η--.

Signed and Sealed this

Twelfth Day of December, 2006

JON W. DUDAS
*Director of the United States Patent and Trademark Office*